(12) United States Patent
Wang et al.

(10) Patent No.: US 10,588,099 B2
(45) Date of Patent: Mar. 10, 2020

(54) POWER CONFIGURATION METHOD AND DEVICE

(71) Applicant: Huawei Technologies Co., Ltd., Shenzhen (CN)

(72) Inventors: Ting Wang, Shanghai (CN); Haibao Ren, Shanghai (CN); Yuanjie Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/150,013

(22) Filed: Oct. 2, 2018

(65) Prior Publication Data

US 2019/0037505 A1 Jan. 31, 2019

Related U.S. Application Data

(63) Continuation of application No. PCT/CN2017/079789, filed on Apr. 7, 2017.

(30) Foreign Application Priority Data

Apr. 8, 2016 (CN) .......................... 2016 1 0217293

(51) Int. Cl.
*H04W 52/42* (2009.01)
*H04B 7/0413* (2017.01)
(Continued)

(52) U.S. Cl.
CPC .......... *H04W 52/42* (2013.01); *H04B 7/0413* (2013.01); *H04B 7/0426* (2013.01);
(Continued)

(58) Field of Classification Search
CPC . H04W 52/42; H04W 72/044; H04W 52/146; H04B 7/0413; H04B 7/0426;
(Continued)

(56) References Cited

U.S. PATENT DOCUMENTS 8,983,391 B2 * 3/2015 Khoshnevis ........ H04W 52/242
455/67.11
9,019,924 B2 * 4/2015 Ng ...................... H04W 72/042
370/329

(Continued)

FOREIGN PATENT DOCUMENTS

CN 101299623 A 11/2008
CN 103650368 A 3/2014
(Continued)

OTHER PUBLICATIONS

"Signaling of DM-RS Port for LTE-A MIMO Transmission," Source: Research in Motion, UK Limited, Agenda Item: 7.4, Document for: Discussion and Decision, 3GPP TSG RAN WG1 Meeting #58bis, Miyazaki, Japan, R1-094111, Oct. 12-16, 2009, 9 pages.

(Continued)

*Primary Examiner* — Hai V Nguyen
(74) *Attorney, Agent, or Firm* — Slater Matsil, LLP

(57) ABSTRACT

A power configuration method and a device, the power configuration method including sending, by a first network device, M power configuration parameters to a second network device, where the M power configuration parameters are corresponding to M antenna port sets, wherein at least one of the M antenna port sets belongs to the first network device, where each power configuration parameter is used to calculate power of a downlink data channel between a corresponding antenna port set and the second network device, and where M is an integer greater than or equal to 2.

20 Claims, 6 Drawing Sheets

(51) Int. Cl.
*H04L 5/00* (2006.01)
*H04B 7/0426* (2017.01)
*H04W 72/04* (2009.01)
*H04W 52/14* (2009.01)

(52) U.S. Cl.
CPC .............. *H04L 5/00* (2013.01); *H04L 5/0035* (2013.01); *H04L 5/0053* (2013.01); *H04W 72/044* (2013.01); *H04L 5/0048* (2013.01); *H04W 52/143* (2013.01)

(58) Field of Classification Search
CPC ....... H04L 5/00; H04L 5/0035; H04L 5/0053; H04L 5/0048
USPC ........................................................ 455/522
See application file for complete search history.

(56) References Cited

U.S. PATENT DOCUMENTS

| | | | | |
|---|---|---|---|---|
| 9,572,063 | B2* | 2/2017 | Etemad | H04W 88/06 |
| 9,699,742 | B2* | 7/2017 | Ko | H04W 52/325 |
| 2010/0074207 | A1 | 3/2010 | Pan et al. | |
| 2011/0235603 | A1* | 9/2011 | Cheng | H04L 5/0032 370/329 |
| 2011/0268077 | A1* | 11/2011 | Wan | H04J 11/0053 370/329 |
| 2011/0274205 | A1* | 11/2011 | Lee, II | H04B 7/0413 375/295 |
| 2013/0040578 | A1* | 2/2013 | Khoshnevis | H04W 52/242 455/67.11 |
| 2013/0265951 | A1* | 10/2013 | Ng | H04W 72/042 370/329 |
| 2014/0133336 | A1* | 5/2014 | Park | H04W 24/10 370/252 |
| 2014/0295909 | A1* | 10/2014 | Ouchi | H04W 52/242 455/522 |
| 2014/0329555 | A1* | 11/2014 | Gao | H04W 52/146 455/522 |
| 2015/0043406 | A1* | 2/2015 | Ko | H04W 52/325 370/311 |
| 2015/0117381 | A1* | 4/2015 | Khoshnevis | H04W 52/242 370/329 |
| 2017/0332365 | A1* | 11/2017 | Lin | H04W 72/0406 |

FOREIGN PATENT DOCUMENTS

| | | |
|---|---|---|
| CN | 103748938 A | 4/2014 |
| CN | 104115433 A | 10/2014 |
| CN | 104247359 A | 12/2014 |
| EP | 2943021 A1 | 11/2015 |

OTHER PUBLICATIONS

"CSI-RS Configurations for CoMP," Source: ZTE, Agenda Item: 7.5 2 1 2, Document for: Discussion and Decision, 3GPP TSG RAN WG1 Meeting #67, San Francisco, USA, R1-113762, Nov. 14-18, 2011, 3 pages.

"On DMRS Enhancements for FD-MIMO," Source: Ericsson, Agenda Item: 7.2.4.2.3, Document for: Discussion and Decision, 3GPP TSG-RAN WG1#82bis, Malmo, Sweden, R1-155677, Oct. 5-9, 2015, 4 pages.

* cited by examiner

POWER CONFIGURATION METHOD AND DEVICE

CROSS-REFERENCE TO RELATED APPLICATIONS

This application is a continuation of International Application No. PCT/CN2017/079789, filed on Apr. 7, 2017, which claims priority to Chinese Patent Application No. 201610217293.8, filed on Apr. 8, 2016, the disclosures of the aforementioned applications are hereby incorporated by reference in their entireties.

TECHNICAL FIELD

Embodiments of the present invention relate to the field of communications technologies, and in particular, to a power configuration method and a device.

BACKGROUND

A next-generation mobile communications system requires large-capacity and high-quality data transmission. A multiple-input multiple-output (MIMO) technology is considered as a key technology that can implement future high-speed data transmission, and has a wide application prospect in a third-generation mobile communications system (3G) and a fourth-generation mobile communications system (4G). A plurality of transmit antennas in a conventional centralized MIMO system are centralized at a base station end. Different from the centralized MIMO, a plurality of transmit antennas in a distributed MIMO system are distributed at different geographical locations, and pairs of receiving and sending links of the transmit antennas are more independent of each other. Therefore, the distributed MIMO system has advantages such as a large capacity, low power consumption, larger coverage, and lower electromagnetic damage to people, and is considered as one of alternative schemes for a future wireless communications system. In a distributed MIMO scenario, to improve signal reliability of an edge user and improve a throughput of an edge cell, data may be transmitted to user equipment (UE) by using a transmission method such as multipoint space frequency block coding (SFBC) or multipoint multi-stream transmission.

When the UE receives data from a plurality of transmission points, because power of downlink data channels between the transmission points and the UE varies, and power of a downlink data channel between a transmission point and the UE is usually used to demodulate data sent by the transmission point by using the downlink data channel, the UE needs to know the power of the downlink data channel between each transmission point and the UE during demodulation. However, currently a higher layer configures only one power configuration parameter for the UE, and the UE can obtain power of a downlink data channel between only one transmission point and the UE based on the power configuration parameter. Therefore, when a plurality of transmission points transmit data to the UE, the UE possibly cannot accurately demodulate data transmitted by each transmission point.

SUMMARY

Embodiments of the present invention provide a power configuration method and a device, so as to resolve a problem that UE cannot obtain power for sending data by a plurality of transmission points.

According to a first aspect, a power configuration method is provided. The method may include a first network device sends M power configuration parameters to a second network device. The M power configuration parameters may be corresponding to M antenna port sets, and at least one of the M antenna port sets belongs to the first network device. Each power configuration parameter is used to calculate power of a downlink data channel between a corresponding antenna port set and the second network device. To be specific, each power configuration parameter is used to calculate power of a downlink data channel sent by the corresponding antenna port set (or sent by using the corresponding antenna port set). M may be an integer greater than or equal to 2.

In this embodiment of the present invention, the first network device may send the M power configuration parameters to the second network device. In this way, the second network device may separately obtain the power of the downlink data channel between the corresponding antenna port set and the second network device based on the M power configuration parameters, so that the second network device can demodulate, based on the obtained power, data sent by the corresponding antenna port set, to obtain a relatively accurate demodulation result.

Optionally, the first network device may send the M power configuration parameters to the second network device by using higher layer signaling.

Optionally, the higher layer signaling may be RRC signaling or other possible higher layer signaling.

Optionally, the first network device may send the M power configuration parameters to the second network device by using physical layer signaling.

Optionally, the physical layer signaling may be physical layer control signaling such as downlink control information (DCI). Alternatively, the physical layer signaling may be other possible signaling.

Optionally, the first network device may send some power configuration parameters in the M power configuration parameters to the second network device by using higher layer signaling, and send the remaining power configuration parameters to the second network device by using physical layer signaling.

With reference to the first aspect, in a first possible implementation of the first aspect, any one of the M power configuration parameters may include reference signal power corresponding to the power configuration parameter, and may further include either of a first parameter and a second parameter. The first parameter may be used to indicate a ratio of power of an antenna port set corresponding to the power configuration parameter when a cell-specific reference signal exists on a symbol to power of the antenna port set when no cell-specific reference signal exists on the symbol, and the second parameter is a dedicated parameter used to calculate power of a downlink data channel between the antenna port set corresponding to the power configuration parameter and the second network device.

Optionally, for example, the cell-specific reference signal may be a cell-level reference signal such as a Cell-specific reference signal (CRS), or may be another possible cell-level reference signal. Alternatively, for example, the cell-specific reference signal may be a UE-level reference signal such as a DMRS, or may be another possible UE-level reference signal.

With reference to the first possible implementation of the first aspect, in a second possible implementation of the first aspect, each power configuration parameter may further include identification information used to identify the power configuration parameter, and the power configuration method may further include the following process. The first network device sends, to the second network device, information used to indicate a correspondence between identification information of a power configuration parameter and at least one of a quantity of data streams, an antenna port, and a codeword, or the first network device sends, to the second network device, information used to indicate a correspondence between a scrambling code sequence, and identification information of a power configuration parameter and at least one of a quantity of data streams, an antenna port, and a codeword.

Optionally, the first network device may send, to the second network device by using physical layer signaling, the information used to indicate the correspondence between identification information of a power configuration parameter and at least one of a quantity of data streams, an antenna port, and a codeword, or the information used to indicate the correspondence between a scrambling code sequence, and identification information of a power configuration parameter and at least one of a quantity of data streams, an antenna port, and a codeword. For example, the physical layer signaling may include physical layer control signaling such as DCI.

Optionally, the first network device may send, to the second network device by using a PDCCH/EPDCCH, the information used to indicate the correspondence between identification information of a power configuration parameter and at least one of a quantity of data streams, an antenna port, and a codeword, or the information used to indicate the correspondence between a scrambling code sequence, and identification information of a power configuration parameter and at least one of a quantity of data streams, an antenna port, and a codeword.

In addition to the M power configuration parameters, the first network device may further send, to the second network device, information used to indicate a corresponding correspondence, so that the second network device can determine, based on the information used to indicate the corresponding correspondence, the antenna port sets respectively corresponding to the M power configuration parameters, to correctly demodulate data transmitted by a corresponding antenna port set.

With reference to the first aspect or the first possible implementation of the first aspect, in a third possible implementation of the first aspect, the first network device may send the M power configuration parameters to the second network device in the following manner. The first network device sends the M power configuration parameters to the second network device by using first signaling, where each power configuration parameter is in a correspondence with an antenna port set, or each power configuration parameter is in a correspondence with at least one of a quantity of data streams, an antenna port, and a codeword, or the first network device sends a first power configuration parameter and M−1 pieces of conversion relationship information to the second network device by using first signaling, where the first power configuration parameter and each of the M−1 pieces of conversion relationship information are in a correspondence with an antenna port set, or the first power configuration parameter and each of the M−1 pieces of conversion relationship information are in a correspondence with at least one of a quantity of data streams, an antenna port, and a codeword. The first power configuration parameter is one of the M power configuration parameters, and each piece of conversion relationship information includes a conversion relationship between the first power configuration parameter and a power configuration parameter other than the first power configuration parameter in the M power configuration parameters. The M−1 pieces of conversion relationship information may be used to obtain M−1 power configuration parameters.

In other words, the first network device may send the M power configuration parameters to the second network device by using one piece of signaling, so as to reduce an amount of signaling that needs to be sent, thereby reducing a quantity of times of interaction between devices. In addition, for the M power configuration parameters, the first network device may send the power configuration parameters to the second network device, so that the second network device can directly obtain the power configuration parameters. Alternatively, the first network device may send conversion relationship information corresponding to a power configuration parameter, so that the second network device can obtain the other power configuration parameters based on the received conversion relationship information and the first power configuration parameter, and there is no need to add all the power configuration parameters, thereby reducing an amount of information carried in the signaling.

Optionally, for example, the first signaling may be higher layer signaling such as RRC signaling. Alternatively, the first signaling may be other possible signaling such as physical layer signaling.

With reference to the first aspect or the first possible implementation of the first aspect, in a fourth possible implementation of the first aspect, the first network device may send the M power configuration parameters to the second network device in the following manner. The first network device sends a first power configuration parameter to the second network device by using first signaling, and sends M−1 power configuration parameters other than the first power configuration parameter in the M power configuration parameters to the second network device by using second signaling, where the first power configuration parameter is one of the M power configuration parameters, and each power configuration parameter is in a correspondence with an antenna port set, or each power configuration parameter is in a correspondence with at least one of a quantity of data streams, an antenna port, and a codeword, or the first network device sends a first power configuration parameter to the second network device by using first signaling, and sends M−1 pieces of conversion relationship information to the second network device by using second signaling, where the first power configuration parameter is one of the M power configuration parameters, and each piece of conversion relationship information includes a conversion relationship between the first power configuration parameter and a power configuration parameter other than the first power configuration parameter in the M power configuration parameters, each of the M−1 pieces of conversion relationship information is in a correspondence with an antenna port set, or each of the M−1 pieces of conversion relationship information is in a correspondence with at least one of a quantity of data streams, an antenna port, and a codeword, and the M−1 pieces of conversion relationship information are used to obtain M−1 power configuration parameters.

In other words, the first network device may separately send the M power configuration parameters to the second network device by using different signaling, so as to reduce an amount of signaling that needs to be sent, thereby reducing a quantity of times of interaction between devices.

In addition, for the M power configuration parameters, the first network device may send the power configuration parameters to the second network device, so that the second network device can directly obtain the power configuration parameters. Alternatively, the first network device may send conversion relationship information corresponding to a power configuration parameter, so that the second network device can obtain the other power configuration parameters based on the received conversion relationship information and the first power configuration parameter, and there is no need to add all the power configuration parameters, thereby reducing an amount of information carried in the signaling.

Optionally, for example, the first signaling may be higher layer signaling such as RRC signaling. Alternatively, the first signaling may be other possible signaling such as physical layer signaling.

Optionally, for example, the second signaling may be higher layer signaling such as RRC signaling. Alternatively, the second signaling may be other possible signaling such as physical layer signaling.

With reference to the third possible implementation or the fourth possible implementation of the first aspect, in a fifth possible implementation of the first aspect, for example, a second power configuration parameter is any power configuration parameter other than the first power configuration parameter in the M power configuration parameters, and for example, information that is about a conversion relationship between the second power configuration parameter and the first power configuration parameter and that is included in the M−1 pieces of conversion relationship information includes a ratio of power of an antenna port set corresponding to the second power configuration parameter to power of an antenna port set corresponding to the first power configuration parameter, and/or an offset between each parameter included in the second power configuration parameter and a corresponding parameter included in the first power configuration parameter.

Content included in several types of possible conversion relationship information is provided herein. Certainly, the conversion relationship information is not limited thereto, provided that another power configuration parameter can be obtained based on the conversion relationship information and the first power configuration parameter.

Optionally, the power of the antenna port set corresponding to the second power configuration parameter may be understood as power of a downlink data channel between the antenna port set corresponding to the second power configuration parameter and the second network device, namely, power of a downlink data channel sent by using the antenna port set corresponding to the second power configuration parameter. Likewise, the power of the antenna port set corresponding to the first power configuration parameter may be understood as power of a downlink data channel between the antenna port set corresponding to the first power configuration parameter and the second network device, namely, power of a downlink data channel sent by using the antenna port set corresponding to the first power configuration parameter.

According to a second aspect, a second power configuration method is provided. The method may include a second network device receives M power configuration parameters sent by a first network device. The M power configuration parameters are corresponding to M antenna port sets, and at least one of the M antenna port sets belongs to the first network device. Each power configuration parameter is used to calculate power of a downlink data channel between a corresponding antenna port set and the second network device. To be specific, each power configuration parameter is used to calculate power of a downlink data channel sent by using the corresponding antenna port set. M is an integer greater than or equal to 2.

The first network device may send the M power configuration parameters to the second network device. In this way, the second network device may separately obtain the power of the downlink data channel between the corresponding antenna port set and the second network device based on the M power configuration parameters, so that the second network device can demodulate, based on the obtained power, data sent by the corresponding antenna port set, to obtain a relatively accurate demodulation result.

Optionally, the second network device may receive, by using higher layer signaling, the M power configuration parameters sent by the first network device.

Optionally, the higher layer signaling may be RRC signaling or other possible higher layer signaling.

Optionally, the second network device may receive, by using physical layer signaling, the M power configuration parameters sent by the first network device.

Optionally, the physical layer signaling may be physical layer control signaling such as DCI. Alternatively, the physical layer signaling may be other possible signaling.

Optionally, the first network device may send some power configuration parameters in the M power configuration parameters to the second network device by using higher layer signaling, and send the remaining power configuration parameters to the second network device by using physical layer signaling. Therefore, the second network device may receive, by using the higher layer signaling, the some power configuration parameters that are in the M power configuration parameters and that are sent by the first network device, and receive, by using the physical layer signaling, the remaining power configuration parameters sent by the second network device.

With reference to the second aspect, in a first possible implementation of the second aspect, any one of the M power configuration parameters includes reference signal power corresponding to the power configuration parameter, and further includes either of a first parameter and a second parameter. The first parameter may be used to indicate a ratio of power of an antenna port set corresponding to the power configuration parameter when a cell-specific reference signal exists on a symbol to power of the antenna port set when no cell-specific reference signal exists on the symbol, and the second parameter is a dedicated parameter used to calculate power of a downlink data channel between the antenna port set corresponding to the power configuration parameter and the second network device.

With reference to the first possible implementation of the second aspect, in a second possible implementation of the second aspect, each power configuration parameter may further include identification information used to identify the power configuration parameter, and the second network device may further receive information that is sent by the first network device and that is used to indicate a correspondence between identification information of a power configuration parameter and at least one of a quantity of data streams, an antenna port, and a codeword.

Optionally, the second network device may receive, by using physical layer signaling, the information that is sent by the first network device and that is used to indicate the correspondence between identification information of a power configuration parameter and at least one of a quantity of data streams, an antenna port, and a codeword. For example, the physical layer signaling may include physical layer control signaling such as DCI.

Optionally, the second network device may receive, by using a PDCCH/EPDCCH, the information that is sent by the second network device and that is used to indicate the correspondence between identification information of a power configuration parameter and at least one of a quantity of data streams, an antenna port, and a codeword.

Optionally, the second network device may further determine, based on at least one of a quantity of data streams, an antenna port, and a codeword of an antenna port set, and the information used to indicate the correspondence between identification information of a power configuration parameter and at least one of a quantity of data streams, an antenna port, and a codeword, the antenna port sets respectively corresponding to the M power configuration parameters.

To be specific, after receiving information used to indicate a corresponding correspondence, the second network device may determine the antenna port sets respectively corresponding to the M power configuration parameters. In this way, after receiving data sent by a corresponding antenna port set, the second network device may demodulate the data based on power of a downlink data channel obtained by using a corresponding power configuration parameter, so that a demodulation result is relatively accurate.

With reference to the first possible implementation of the second aspect, in a third possible implementation of the second aspect, each power configuration parameter may further include identification information used to identify the power configuration parameter, and the second network device may further receive information that is sent by the first network device and that is used to indicate a correspondence between a scrambling code sequence, and identification information of a power configuration parameter and at least one of a quantity of data streams, an antenna port, and a codeword.

Optionally, the second network device may receive, by using physical layer signaling, the information that is sent by the second network device and that is used to indicate the correspondence between a scrambling code sequence, and identification information of a power configuration parameter and at least one of a quantity of data streams, an antenna port, and a codeword. For example, the physical layer signaling may include physical layer control signaling such as DCI.

Optionally, the second network device may receive, by using a PDCCH/EPDCCH, the information that is sent by the second network device and that is used to indicate the correspondence between a scrambling code sequence, and identification information of a power configuration parameter and at least one of a quantity of data streams, an antenna port, and a codeword.

Optionally, the second network device may further determine the antenna port sets respectively corresponding to the M power configuration parameters, based on a scrambling code sequence and at least one of a quantity of data streams, an antenna port, and a codeword of an antenna port set, and based on the information used to indicate the correspondence between a scrambling code sequence, and identification information of a power configuration parameter and at least one of a quantity of data streams, an antenna port, and a codeword.

To be specific, after receiving information used to indicate a corresponding correspondence, the second network device may determine the antenna port sets respectively corresponding to the M power configuration parameters. In this way, after receiving data sent by a corresponding antenna port set, the second network device may demodulate the data based on power of a downlink data channel obtained by using a corresponding power configuration parameter, so that a demodulation result is relatively accurate.

With reference to the second aspect or the first possible implementation of the second aspect, in a fourth possible implementation of the second aspect, the second network device may receive, in the following manner, the M power configuration parameters sent by the first network device. The second network device receives first signaling sent by the first network device, where the first signaling carries the M power configuration parameters.

Optionally, for example, the first signaling may be higher layer signaling such as RRC signaling. Certainly, the first signaling may alternatively be other possible signaling.

In other words, the first network device may send all of the M power configuration parameters to the second network device by using one piece of signaling, so as to reduce a quantity of signaling interaction times, and the second network device may directly obtain the M power configuration parameters based on the first signaling, which is relatively simple.

Optionally, the second network device may further determine, based on a correspondence between each power configuration parameter and an antenna port set, the antenna port sets respectively corresponding to the M power configuration parameters, or the second network device may further determine, based on a correspondence between each power configuration parameter and at least one of a quantity of data streams, an antenna port, and a codeword, the antenna port sets respectively corresponding to the M power configuration parameters.

Optionally, information used to indicate a corresponding correspondence may also be carried in the first signaling, or may not be carried in the first signaling. For example, the information may be predefined in a protocol, or may be negotiated by the first network device and the second network device in advance. In conclusion, the second network device may determine the antenna port sets respectively corresponding to the M power configuration parameters. In this way, after receiving data sent by a corresponding antenna port set, the second network device may demodulate the data based on power of a downlink data channel obtained by using a corresponding power configuration parameter, so that a demodulation result is relatively accurate.

With reference to the second aspect or the first possible implementation of the second aspect, in a fifth possible implementation of the second aspect, the second network device may receive, in the following manner, the M power configuration parameters sent by the first network device. The second network device receives first signaling sent by the first network device, where the first signaling carries a first power configuration parameter and M−1 pieces of conversion relationship information. The first power configuration parameter is one of the M power configuration parameters, and each piece of conversion relationship information includes a conversion relationship between the first power configuration parameter and a power configuration parameter other than the first power configuration parameter in the M power configuration parameters.

Optionally, for example, the first signaling may be higher layer signaling such as RRC signaling. Certainly, the first signaling may alternatively be other possible signaling.

In other words, the first network device may not need to add each power configuration parameter to the signaling, but may add the conversion relationship information to the signaling. For example, a data amount of the conversion relationship information may be usually smaller than that of the corresponding power configuration parameter, so that an amount of data carried in the signaling can be reduced.

Optionally, the second network device may further determine an antenna port set corresponding to the first power configuration parameter, and obtain M−1 power configuration parameters other than the first power configuration parameter in the M power configuration parameters based on the M−1 pieces of conversion relationship information and the first power configuration parameter.

In other words, after receiving the first power configuration parameter and the M−1 pieces of conversion relationship information, the second network device may obtain the M−1 power configuration parameters.

Optionally, the second network device may further determine, based on a correspondence between the first power configuration parameter, each of the M−1 pieces of conversion relationship information, and an antenna port set, the antenna port sets respectively corresponding to the M power configuration parameters, or the second network device may further determine, based on a correspondence between the first power configuration parameter, each of the M−1 pieces of conversion relationship information, and at least one of a quantity of data streams, an antenna port, and a codeword, the antenna port sets respectively corresponding to the M power configuration parameters.

Optionally, information used to indicate a corresponding correspondence may also be carried in the first signaling, or may not be carried in the first signaling. For example, the information may be predefined in a protocol, or may be negotiated by the first network device and the second network device in advance. In conclusion, the second network device may determine the antenna port sets respectively corresponding to the M power configuration parameters. In this way, after receiving data sent by a corresponding antenna port set, the second network device may demodulate the data based on power of a downlink data channel obtained by using a corresponding power configuration parameter, so that a demodulation result is relatively accurate.

With reference to the second aspect or the first possible implementation of the second aspect, in a sixth possible implementation of the second aspect, the second network device may receive, in the following manner, the M power configuration parameters sent by the first network device. The second network device receives first signaling and second signaling that are sent by the first network device. The first signaling carries a first power configuration parameter, the second signaling carries M−1 power configuration parameters other than the first power configuration parameter in the M power configuration parameters, and the first power configuration parameter may be one of the M power configuration parameters.

In other words, the first network device may send the M power configuration parameters to the second network device by using different signaling, so that the second network device can more easily identify a correspondence between a power configuration parameter and an antenna port set, and one piece of signaling is prevented from carrying excessive content.

Optionally, the second network device may further determine, based on a correspondence between each of the M−1 power configuration parameters and an antenna port set, antenna port sets respectively corresponding to the M−1 power configuration parameters, or the second network device may further determine, based on a correspondence between each of the M−1 power configuration parameters and at least one of a quantity of data streams, an antenna port, and a codeword, antenna port sets respectively corresponding to the M−1 power configuration parameters.

Optionally, information used to indicate a corresponding correspondence may also be carried in the first signaling or the second signaling, or may not be carried in either signaling. For example, the information may be predefined in a protocol, or may be negotiated by the first network device and the second network device in advance. In conclusion, the second network device may determine the antenna port sets respectively corresponding to the M power configuration parameters. In this way, after receiving data sent by a corresponding antenna port set, the second network device may demodulate the data based on power of a downlink data channel obtained by using a corresponding power configuration parameter, so that a demodulation result is relatively accurate.

With reference to the second aspect or the first possible implementation of the second aspect, in a seventh possible implementation of the second aspect, the second network device may receive, in the following manner, the M power configuration parameters sent by the first network device. The second network device receives first signaling and second signaling that are sent by the first network device. The first signaling carries a first power configuration parameter, and the second signaling carries M−1 pieces of conversion relationship information. The first power configuration parameter may be one of the M power configuration parameters, and each piece of conversion relationship information includes a conversion relationship between the first power configuration parameter and each of M−1 power configuration parameters other than the first power configuration parameter in the M power configuration parameters.

In other words, the first network device may separately send the first power configuration parameter and the conversion relationship information to the second network device by using different signaling, so that the second network device can more easily identify a correspondence between a power configuration parameter and an antenna port set, and one piece of signaling is prevented from carrying excessive content.

Optionally, the second network device may further determine an antenna port set corresponding to the first power configuration parameter, and obtain the M−1 power configuration parameters other than the first power configuration parameter in the M power configuration parameters based on the M−1 pieces of conversion relationship information and the first power configuration parameter.

In other words, the second network device may obtain the M−1 power configuration parameters based on the conversion relationship information and the first power configuration parameter.

Optionally, the second network device may further determine, based on a correspondence between each of the M−1 pieces of conversion relationship information and an antenna port set, antenna port sets respectively corresponding to the M−1 power configuration parameters, or the second network device may further determine, based on a correspondence between each of the M−1 pieces of conversion relationship information and at least one of a quantity of data streams, an antenna port, and a codeword, antenna port sets respectively corresponding to the M−1 power configuration parameters.

Optionally, information used to indicate a corresponding correspondence may also be carried in the first signaling or the second signaling, or may not be carried in either signaling. For example, the information may be predefined in a protocol, or may be negotiated by the first network device and the second network device in advance. In conclusion, the second network device may determine the antenna port sets respectively corresponding to the M power configuration parameters. In this way, after receiving data sent by a corresponding antenna port set, the second network device may demodulate the data based on power of a downlink data channel obtained by using a corresponding power configuration parameter, so that a demodulation result is relatively accurate.

With reference to the fifth possible implementation or the seventh possible implementation of the second aspect, in an eighth possible implementation of the second aspect, for example, a second power configuration parameter is any power configuration parameter other than the first power configuration parameter in the M power configuration parameters, and information that is about a conversion relationship between the second power configuration parameter and the first power configuration parameter and that is included in the M−1 pieces of conversion relationship information may include a ratio of power of an antenna port set corresponding to the second power configuration parameter to power of an antenna port set corresponding to the first power configuration parameter, and/or an offset between each parameter included in the second power configuration parameter and a corresponding parameter included in the first power configuration parameter.

Content included in several types of possible conversion relationship information is provided herein. Certainly, the conversion relationship information is not limited thereto, provided that another power configuration parameter can be obtained based on the conversion relationship information and the first power configuration parameter.

According to a third aspect, a first network device is provided. The network device may include a memory, a processor, and a transmitter. The memory may be configured to store an instruction required by the processor to execute a task. The processor may be configured to execute the instruction stored in the memory, to obtain M power configuration parameters. The transmitter may be configured to send the M power configuration parameters to a second network device. The M power configuration parameters are corresponding to M antenna port sets, and at least one of the M antenna port sets belongs to the network device. Each power configuration parameter is used to calculate power of a downlink data channel between a corresponding antenna port set and the second network device. To be specific, each power configuration parameter is used to calculate power of a downlink data channel sent by using the corresponding antenna port set. M is an integer greater than or equal to 2.

Optionally, the network device may further include a communications interface, configured to support communication between the network device and another network device in a communications system, for example, a core network node.

With reference to the third aspect, in a first possible implementation of the third aspect, any one of the M power configuration parameters may include reference signal power corresponding to the power configuration parameter, and may further include either of a first parameter and a second parameter. The first parameter is used to indicate a ratio of power of an antenna port set corresponding to the power configuration parameter when a cell-specific reference signal exists on a symbol to power of the antenna port set when no cell-specific reference signal exists on the symbol, and the second parameter is a dedicated parameter used to calculate power of a downlink data channel between the antenna port set corresponding to the power configuration parameter and the second network device.

With reference to the first possible implementation of the third aspect, in a second possible implementation of the third aspect, each power configuration parameter may further include identification information used to identify the power configuration parameter, and the transmitter may be further configured to send, to the second network device, information used to indicate a correspondence between identification information of a power configuration parameter and at least one of a quantity of data streams, an antenna port, and a codeword, or send, to the second network device, information used to indicate a correspondence between a scrambling code sequence, and identification information of a power configuration parameter and at least one of a quantity of data streams, an antenna port, and a codeword.

With reference to the third aspect or the first possible implementation of the third aspect, in a third possible implementation of the third aspect, the transmitter may be configured to send the M power configuration parameters to the second network device by using first signaling, where each power configuration parameter is in a correspondence with an antenna port set, or each power configuration parameter is in a correspondence with at least one of a quantity of data streams, an antenna port, and a codeword, or send a first power configuration parameter and M−1 pieces of conversion relationship information to the second network device by using first signaling, where the first power configuration parameter and each of the M−1 pieces of conversion relationship information are in a correspondence with an antenna port set, or the first power configuration parameter and each of the M−1 pieces of conversion relationship information are in a correspondence with at least one of a quantity of data streams, an antenna port, and a codeword, the first power configuration parameter is one of the M power configuration parameters, and each piece of conversion relationship information includes a conversion relationship between the first power configuration parameter and a power configuration parameter other than the first power configuration parameter in the M power configuration parameters, and the M−1 pieces of conversion relationship information are used to obtain M−1 power configuration parameters.

With reference to the third aspect or the first possible implementation of the third aspect, in a fourth possible implementation of the third aspect, the transmitter may be configured to send a first power configuration parameter to the second network device by using first signaling, and send M−1 power configuration parameters other than the first power configuration parameter in the M power configuration parameters to the second network device by using second signaling, where the first power configuration parameter is one of the M power configuration parameters, and each power configuration parameter is in a correspondence with an antenna port set, or each power configuration parameter is in a correspondence with at least one of a quantity of data streams, an antenna port, and a codeword, or send a first power configuration parameter to the second network device by using first signaling, and send M−1 pieces of conversion relationship information to the second network device by using second signaling, where the first power configuration parameter is one of the M power configuration parameters, and each piece of conversion relationship information includes a conversion relationship between the first power configuration parameter and a power configuration parameter other than the first power configuration parameter in the M power configuration parameters, each of the M−1 pieces of conversion relationship information is in a correspondence with an antenna port set, or each of the M−1 pieces of conversion relationship information is in a correspondence with at least one of a quantity of data streams, an antenna port, and a codeword, and the M−1 pieces of conversion relationship information are used to obtain M−1 power configuration parameters.

With reference to the third possible implementation or the fourth possible implementation of the third aspect, in a fifth possible implementation of the third aspect, a second power configuration parameter is any power configuration parameter other than the first power configuration parameter in the M power configuration parameters, and information that is about a conversion relationship between the second power configuration parameter and the first power configuration parameter and that is included in the M−1 pieces of conversion relationship information includes a ratio of power of an antenna port set corresponding to the second power configuration parameter to power of an antenna port set corresponding to the first power configuration parameter, and/or an offset between each parameter included in the second power configuration parameter and a corresponding parameter included in the first power configuration parameter.

According to a fourth aspect, a second network device is provided. The network device may include a memory, a processor, and a receiver. The memory may be configured to store an instruction. The processor may be configured to execute the instruction stored in the memory, and receive, by using the receiver, M power configuration parameters sent by a first network device. The M power configuration parameters are corresponding to M antenna port sets, and at least one of the M antenna port sets belongs to the first network device. Each power configuration parameter is used to calculate power of a downlink data channel between a corresponding antenna port set and the network device, and M is an integer greater than or equal to 2.

With reference to the fourth aspect, in a first possible implementation of the fourth aspect, any one of the M power configuration parameters includes reference signal power corresponding to the power configuration parameter, and further includes either of a first parameter and a second parameter. The first parameter is used to indicate a ratio of power of an antenna port set corresponding to the power configuration parameter when a cell-specific reference signal exists on a symbol to power of the antenna port set when no cell-specific reference signal exists on the symbol, and the second parameter is a dedicated parameter used to calculate power of a downlink data channel between the antenna port set corresponding to the power configuration parameter and the second network device. In other words, the second parameter is a dedicated parameter used to calculate power of a downlink data channel sent by using the antenna port set corresponding to the power configuration parameter.

With reference to the first possible implementation of the fourth aspect, in a second possible implementation of the fourth aspect, each power configuration parameter may further include identification information used to identify the power configuration parameter, and the receiver may be further configured to receive information that is sent by the first network device and that is used to indicate a correspondence between identification information of a power configuration parameter and at least one of a quantity of data streams, an antenna port, and a codeword.

Further, the processor may be further configured to determine, based on at least one of a quantity of data streams, an antenna port, and a codeword of an antenna port set, and the information used to indicate the correspondence between identification information of a power configuration parameter and at least one of a quantity of data streams, an antenna port, and a codeword, the antenna port sets respectively corresponding to the M power configuration parameters.

With reference to the first possible implementation of the fourth aspect, in a third possible implementation of the fourth aspect, each power configuration parameter further includes identification information used to identify the power configuration parameter, and the receiver may be further configured to receive information that is sent by the first network device and that is used to indicate a correspondence between a scrambling code sequence, and identification information of a power configuration parameter and at least one of a quantity of data streams, an antenna port, and a codeword.

Further, the processor may be further configured to determine the antenna port sets respectively corresponding to the M power configuration parameters based on a scrambling code sequence, and at least one of a quantity of data streams, an antenna port, and a codeword of an antenna port set, and based on the information used to indicate the correspondence between a scrambling code sequence, and identification information of a power configuration parameter and at least one of a quantity of data streams, an antenna port, and a codeword.

With reference to the fourth aspect or the first possible implementation of the fourth aspect, in a fourth possible implementation of the fourth aspect, the receiver may be further configured to receive first signaling sent by the first network device, where the first signaling carries the M power configuration parameters. Further, the processor may be further configured to determine, based on a correspondence between each power configuration parameter and an antenna port set, the antenna port sets respectively corresponding to the M power configuration parameters, or determine, based on a correspondence between each power configuration parameter and at least one of a quantity of data streams, an antenna port, and a codeword, the antenna port sets respectively corresponding to the M power configuration parameters.

With reference to the fourth aspect or the first possible implementation of the fourth aspect, in a fifth possible implementation of the fourth aspect, the receiver may be further configured to receive first signaling sent by the first network device, where the first signaling carries a first power configuration parameter and M−1 pieces of conversion relationship information. Further, the processor may be further configured to determine an antenna port set corresponding to the first power configuration parameter, and obtain M−1 power configuration parameters other than the first power configuration parameter in the M power configuration parameters based on the M−1 pieces of conversion relationship information and the first power configuration parameter. Still further, the processor may be further configured to determine, based on a correspondence between the first power configuration parameter, each of the M−1 pieces of conversion relationship information, and an antenna port set, the antenna port sets respectively corresponding to the M power configuration parameters, or determine, based on a correspondence between the first power configuration parameter, each of the M−1 pieces of conversion relationship information, and at least one of a quantity of data streams, an antenna port, and a codeword, the antenna port sets respectively corresponding to the M power configuration parameters.

With reference to the fourth aspect or the first possible implementation of the fourth aspect, in a sixth possible implementation of the fourth aspect, the receiver may be further configured to receive first signaling and second signaling that are sent by the first network device, where the first signaling carries a first power configuration parameter, the second signaling carries M−1 power configuration parameters other than the first power configuration parameter in the M power configuration parameters, and the first power configuration parameter is one of the M power configuration parameters. Further, the processor may be further configured to determine, based on a correspondence between each of the M−1 power configuration parameter and an antenna port set, antenna port sets respectively corresponding to the M−1 power configuration parameters, or determine, based on a correspondence between each of the M−1 power configuration parameters and at least one of a quantity of data streams, an antenna port, and a codeword, antenna port sets respectively corresponding to the M−1 power configuration parameters.

With reference to the fourth aspect or the first possible implementation of the fourth aspect, in a seventh possible implementation of the fourth aspect, the receiver may be further configured to receive first signaling and second signaling that are sent by the first network device, where the first signaling carries a first power configuration parameter, the second signaling carries M−1 pieces of conversion relationship information, the first power configuration parameter is one of the M power configuration parameters, and each piece of conversion relationship information includes a conversion relationship between the first power configuration parameter and each of M−1 power configuration parameters other than the first power configuration parameter in the M power configuration parameters. Further, the processor may be further configured to determine an antenna port set corresponding to the first power configuration parameter, and obtain the M−1 power configuration parameters other than the first power configuration parameter in the M power configuration parameters based on the M−1 pieces of conversion relationship information and the first power configuration parameter. Still further, the processor may be further configured to determine, based on a correspondence between each of the M−1 pieces of conversion relationship information and an antenna port set, antenna port sets respectively corresponding to the M−1 power configuration parameters, or determine, based on a correspondence between each of the M−1 pieces of conversion relationship information and at least one of a quantity of data streams, an antenna port, and a codeword, antenna port sets respectively corresponding to the M−1 power configuration parameters.

With reference to the fifth possible implementation or the seventh possible implementation of the fourth aspect, in an eighth possible implementation of the fourth aspect, a second power configuration parameter is any power configuration parameter other than the first power configuration parameter in the M power configuration parameters, and information that is about a conversion relationship between the second power configuration parameter and the first power configuration parameter and that is included in the M−1 pieces of conversion relationship information includes a ratio of power of an antenna port set corresponding to the second power configuration parameter to power of an antenna port set corresponding to the first power configuration parameter, and/or an offset between each parameter included in the second power configuration parameter and a corresponding parameter included in the first power configuration parameter.

According to a fifth aspect, a third network device is provided. The network device may include a module configured to perform the method in the first aspect.

According to a sixth aspect, a fourth network device is provided. The network device may include a module configured to perform the method in the second aspect.

DETAILED DESCRIPTION OF ILLUSTRATIVE EMBODIMENTS

Figure 1A:
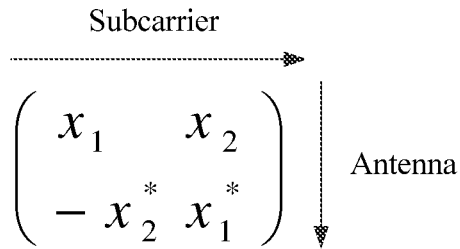
FIG. 1A is a schematic diagram of an implementation of SFBC.

To make the objectives, technical solutions, and advantages of the embodiments of the present invention clearer, the following clearly and describes the technical solutions of the embodiments of the present invention with reference to the accompanying drawings in the embodiments of the present invention.

Technologies described in this specification may be applied to various communications systems, for example, 3G, 4G, or a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a Single Carrier Frequency-Division Multiple Access (SC-FDMA) system, a general packet radio service (GPRS) system, a Long Term Evolution (LTE) system, and other similar communications systems.

In the embodiments of the present invention, an existing MIMO technology (including a diversity technology for improving transmission reliability and a multi-stream technology for improving a data transmission rate) may be combined with coordinated multipoint transmission based on existing CoMP, so as to better serve a user.

The embodiments of the present invention are applicable to both a homogeneous network scenario and a heterogeneous network scenario, and a type of a transmission point is not limited. For example, the embodiments of the present invention may be applied to coordinated multipoint transmission between macro base stations, between micro base stations, and between a macro base station and a micro base station.

The embodiments of the present invention may be applied to a time division duplex (TDD) system or a frequency division duplex (FDD) system, may be applied to a single carrier system or a multicarrier system, and may be commonly applied to a high-frequency communications system (higher than a 6 GHz frequency band) or a low-frequency communications system (lower than a 6 GHz frequency band).

The following describes some terms in the embodiments of the present invention to facilitate understanding of a person skilled in the art.

(1) A terminal device is a device that provides voice and/or data connectivity for a user, and for example, may include a handheld device with a wireless connection function or a processing device connected to a wireless modem. The terminal device may communicate with a core network by using a radio access network (RAN), and exchange voice and/or data with the RAN. The terminal device may include UE, a wireless terminal device, a mobile terminal device, a subscriber unit, a subscriber station, a mobile station, a mobile, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, computer built-in, or in-vehicle mobile apparatus. For example, the terminal device may be a device such as a personal communications service (PCS) phone, a cordless phone, a Session Initiation Protocol (SIP) phone, a wireless local loop (WLL) station, or a personal digital assistant (PDA).

(2) A network device includes, for example, a base station (for example, an access point), and may be specifically a device that communicates with a wireless terminal device on an air interface in an access network by using one or more sectors. The base station may be configured to convert a received over-the-air frame and a received Internet Protocol (IP) packet into each other, and serves as a router between the wireless terminal device and the rest part of the access network. The rest part of the access network may include an IP network. The base station may further coordinate attribute management of the air interface. For example, the base station may be a radio network controller (RNC) or a base station controller (BSC), or may be an evolved NodeB (NodeB, eNB, or e-NodeB) in an LTE-Advanced (LTE-A) system. This is not limited in the embodiments of the present invention.

(3) Coordinated multipoint transmission/reception (CoMP) means that a plurality of transmission points at different geographical locations jointly transmit data to a terminal device. For example, a plurality of transmission points may transmit data to a terminal device by using a physical downlink shared channel (PDSCH), or may jointly receive data sent by a terminal device, for example, by using a physical uplink shared channel (PUSCH).

(4) SFBC is usually used as a transmit diversity scheme of two antenna ports in the LTE system. A basic idea is that to-be-sent information bits enter a space-frequency encoder in a unit of two symbols after constellation mapping. For example, referring to FIG. 1A, SFBC of two antennas is as follows. A subcarrier 1 of an antenna 1 sends $x_1$, and a subcarrier 1 of an antenna 2 sends $-x^*_2$, and a subcarrier 2 of the antenna 1 sends $x_2$, and a subcarrier 2 of the antenna 2 sends $x^*_1$. The to-be-sent information bits enter the space-frequency encoder in a unit of two symbols after the constellation mapping. In a wireless mobile communications system, a diversity technology is usually used to resist fading and improve link reliability.

Multipoint SFBC transmission means that antennas of two or more distributed transmission points transmit a signal in an SFBC manner.

(5) Multipoint multi-stream transmission means that two or more distributed transmission points independently perform precoding to transmit different data streams or different code blocks to a same terminal device. However, in a CoMP technology, different transmission points usually transmit a same data stream to a same terminal device.

(6) With respect to quasi co-location (QCL), a MIMO technology may also be referred to as a multiple-antenna technology, and can improve system reliability through space diversity, increase a system capacity through spatial multiplexing, and improve cell coverage through beamforming. A basic physical layer technology in the LTE system includes the MIMO technology.

In a multiple-antenna system of LTE, different logical ports are defined to distinguish between different channels. A UE-level reference signal such as a demodulation reference signal (DMRS) included in the existing LTE system is sent by using an antenna port 5, an antenna port 7, an antenna port 8, or one or more of antenna ports 7 to 14. Therefore, these antenna ports used to send the DMRS are also referred to as DMRS ports. Likewise, data may also be sent on different antenna ports, for example, on one or more of the antenna port 5, the antenna port 7, the antenna port 8, and the like. These antenna ports used to send the data are also referred to as data ports. A receive end may perform channel estimation and data demodulation by using a DMRS sent on an antenna port the same as a data port.

In an LTE release 10, a new transmission mode, namely, a transmission mode 9, is introduced. The new transmission mode supports eight antenna ports, and supports multi-user MIMO transmission. To support transmission using eight antennas, a base station needs to indicate, to a user in a physical downlink control channel such as a physical downlink control channel (PDCCH) in LTE, a quantity of precoding layers corresponding to physical downlink shared channel (such as a PDSCH in LTE) data and an antenna port corresponding to a DMRS. A terminal device may detect a corresponding indication field in the PDCCH to obtain a quantity of layers included in the received PDSCH data and an antenna port corresponding to each layer. The terminal device performs channel estimation by using the DMRS sent by the antenna port, and then demodulates the PDSCH data.

In an LTE $3^{rd}$ Generation Partnership Project (3GPP) release 11, antenna port quasi co-location that is referred to as QCL for short in the LTE system is introduced to support coordinated multipoint transmission/reception. Signals sent from a QCL antenna port undergo same large-scale fading. The large-scale fading includes delay spread, Doppler spread, Doppler frequency shift, an average channel gain, and an average delay. In order that the terminal device receives downlink control information from a serving base station by using the PDCCH, and receives downlink data from a coordinated base station by using the PDSCH, a new transmission mode, namely, a transmission mode 10, is defined in the release 11. In the transmission mode 10, a physical downlink shared channel resource element mapping and quasi-co-location indicator that is referred to as a PQI (PDSCH RE Mapping and QCL Indicator) for short in the LTE system, is mainly introduced to indicate a base station from which the downlink data is sent and an antenna port that is consistent with a corresponding large-scale channel feature. UE may learn of, based on the PQI with reference to a PDSCH mapping message element configured by using radio resource control (RRC) signaling, a radio channel parameter corresponding to an antenna port that needs to be used to demodulate the downlink data.

The PQI in the LTE release 11 supports only one parameter, and this means that the PDSCH can be sent from only one QCL antenna port. Consequently, an application range of the transmission mode 10 is limited. For example, in the distributed MIMO system or a coordinated multi-site transmission system, only a single frequency network (SFN) technology (to be specific, a plurality of antenna ports/base stations send same modulated data on a same time-frequency resource) can be used to synthesize a plurality of non-QCL antenna ports into antenna ports belonging to a same QCL set, to perform SFN transmission for a single user. For example, two antenna ports at different geographical locations respectively belong to two QCL sets. If data needs to be sent to a same terminal device on a same time domain symbol by using the two antenna ports, according to an existing protocol, the data can be sent to the terminal device provided that the two antenna ports are virtualized into one synthesized antenna port. A plurality of antenna ports belonging to different QCL antenna port sets cannot perform basic MIMO transmission such as multi-stream transmission or transmit diversity transmission for a single user on a same time domain symbol.

(7) A transmission point is a device that can transmit data to a terminal device. In the embodiments of the present invention, a concept of the transmission point is equivalent to that of an antenna port set, and one transmission point may be considered as one antenna port set. The antenna port set herein may be a hardware concept or a logical concept. One antenna port set may include one or more antenna ports.

For example, the transmission point may be a base station. In other words, one antenna port set is corresponding to one base station, and different base stations may be considered as different transmission points. Alternatively, the transmission point may be a cell. In other words, one antenna port set is corresponding to one cell, and different cells may be considered as different transmission points. Alternatively, one cell may include a plurality of transmission points. In other words, one cell includes a plurality of antenna port sets. For example, a plurality of building baseband units (BBU) and remote radio units (RRU) may be deployed in a coverage range of one cell, and an antenna port set corresponding to each BBU and RRU may be considered as one transmission point. The concept of the transmission point is not limited in the embodiments of the present invention, provided that each transmission point can independently transmit data to the terminal device.

In the embodiments of the present invention, each power configuration parameter may be corresponding to one transmission point, in other words, one antenna port set.

For a same transmission point, different power configuration parameters may be used at different moments. In addition, if a same cell includes a plurality of transmission points, the cell may be corresponding to a plurality of power configuration parameters.

(8) One power configuration parameter may be corresponding to one antenna port set. A power configuration parameter of an antenna port set may be used to obtain power of a downlink data channel between the antenna port set and a terminal device. Alternatively, a power configuration parameter of an antenna port set may be used to obtain power of a downlink data channel sent by the antenna port set.

Different antenna port sets may be corresponding to a same power configuration parameter, and certainly, may alternatively be corresponding to different power configuration parameters.

(9) A downlink data channel may include, for example, a PDSCH or another possible downlink data channel.

(10) A first network device may include, for example, a base station, a common terminal device, or a terminal device executing a relay (relay) task.

A second network device may include, for example, a common terminal device, a terminal device executing a relay task, or a base station.

The first network device and the second network device may be of a same type, or may be of different types. For example, in a device-to-device (D2D) scenario, both the first network device and the second network device may be base stations or terminal devices, or may be set in another possible manner.

(11) In the embodiments of the present invention, the terms "system" and "network" may be interchanged, the terms "cell" and "carrier" may be interchanged, and concepts of "a quantity of data streams" and "a quantity of transmission layers" may be interchanged. The term "a plurality of" means two or more. The term "and/or" describes an association relationship between associated objects and represents that three relationships may exist. For example, A and/or B may represent the following three cases. Only A exists, both A and B exist, and only B exists. In addition, the character "/" usually represents an "or" relationship between the associated objects unless specified otherwise.

A possible application scenario of the embodiments of the present invention is first described.

Figure 1B:
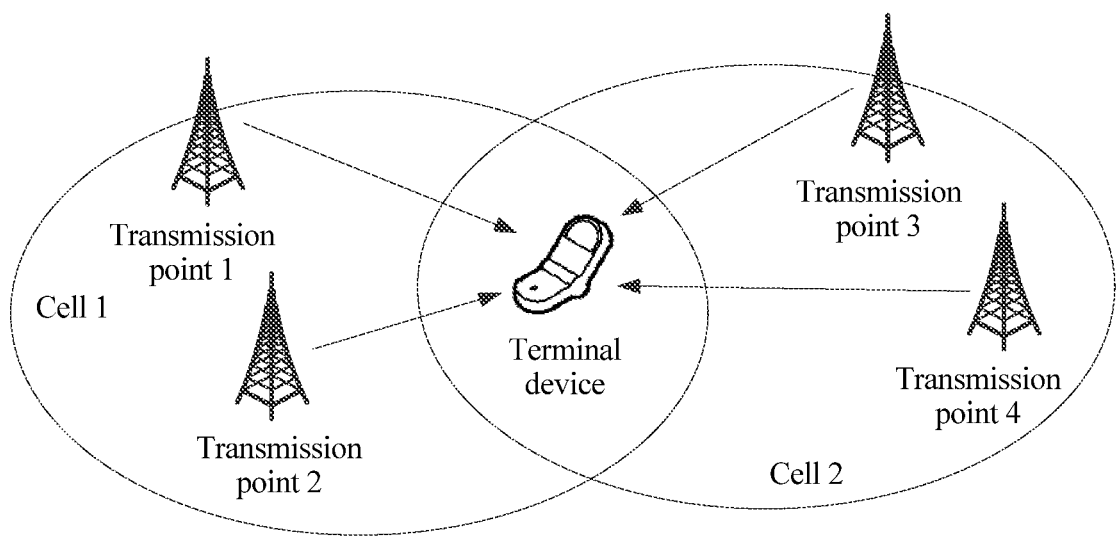
FIG. 1B is a schematic diagram of a scenario in which a plurality of antenna sites perform coordinated transmission.

Referring to FIG. 1B, FIG. 1B is a schematic diagram of a scenario in which a plurality of antenna sites perform coordinated transmission. For example, that a terminal device is a mobile phone is used as an example. A left circle represents a coverage range of a cell 1, and the cell 1 includes two transmission points that are respectively a transmission point 1 and a transmission point 2 shown in FIG. 1B. A right circle represents a coverage range of a cell 2, and the cell 2 also includes two transmission points that are respectively a transmission point 3 and a transmission point 4 shown in FIG. 1B. The transmission point 1, the transmission point 2, the transmission point 3, and the transmission point 4 all participate in coordinated transmission for the terminal device.

Next, how the terminal device obtains power of a downlink data channel between a transmission point and the terminal device through calculation is described. Optionally, two types of reference signals, namely, a cell-level reference signal and a UE-level reference signal, may be used in the following process. For example, the cell-level reference signal may include a cell-specific reference signal, and a possible cell-specific reference signal is, for example, a cell-specific reference signal (CRS). The CRS may be used to perform downlink channel estimation, and may be used to demodulate data in a non-beamforming (beamforming) mode. Certainly, in addition to the CRS, another possible cell-specific reference signal may be further included. For example, the UE-level reference signal may include a UE-specific reference signal, and a possible UE-specific reference signal is, for example, a DMRS. The DMRS may be used to perform uplink control and related data channel demodulation. Certainly, in addition to the DMRS, another possible UE-specific reference signal may be further included. It should be noted that the name in this embodiment of the present invention does not constitute a limitation on a reference signal itself. For example, the CRS or the DMRS may have another possible name, provided that a corresponding function can be implemented.

In a fallback mode of transmission modes (TM) 1 to 7 and TMs 8 to 10 in an LTE system, when no cell-specific reference signal exists on a symbol, PDSCH energy per resource element (EPRE)/CRS EPRE=$\rho_A$, or when a cell-specific reference signal exists on a symbol, PDSCH EPRE/CRS EPRE=$\rho_B$.

In the TMs 8 to 10 in the LTE system, during demodulation based on the UE-specific reference signal, when a UE-specific reference signal exists on a symbol, PDSCH EPRE/DMRS EPRE=0 dB or −3 dB, or when a cell-specific reference signal exists on a symbol, PDSCH EPRE/CRS EPRE=$\rho_B$, or when neither a cell-specific reference signal nor a UE-specific reference signal exists on a symbol, PDSCH EPRE/CRS EPRE=$\rho_A$.

Both $\rho_A$ and $\rho_B$ represent power, and $P_A$ is a dedicated parameter used to calculate power of a downlink data channel.

A method for determining $\rho_A$ is as follows.

1. When the terminal device is in the TMs 8 to 10, and no terminal device-specific reference signal exists on a physical resource block (PRB) to which a corresponding PDSCH is mapped, or when the terminal device is in the TMs 1 to 7, the terminal device may make an assumption for space division multiplexing using more than one layer or a PDSCH transmission associated with a multi-user MIMO transmission scheme, for 16 quadrature amplitude modulation (QAM), 64 QAM, or 256 QAM.

When the terminal device receives PDSCH data precoded in a transmit diversity manner on four cell-specific antenna ports, $\rho_A=\delta_{power\text{-}offset}+P_A+10 \log_{10}(2)$ [dB], otherwise $\rho_A=\theta_{power\text{-}offset}+P_A$ [dB].

For all PDSCH transmission except multi-user MIMO transmission, $\delta_{power\text{-}offset}$ is equal to 0 dB, and $P_A$ may be understood as a dedicated parameter used to calculate power of a downlink data channel between an antenna port set and the terminal device.

2. For a higher layer parameter servCellp-a-r12 configured by the terminal device, when the terminal device is in the TMs 8 to 10, and no terminal device-specific reference signal exists on a PRB to which a corresponding PDSCH is mapped, or when the terminal device is in the TMs 1 to 7, the terminal device may make an assumption for single antenna-based transmission or a transmit diversity transmission mode or spatial multiplexing using a single transmission layer for quadrature phase shift keying (QPSK), and make an assumption in which PDSCH transmission is not associated with a multi-user MIMO transmission mode, and the PDSCH is scheduled by a physical downlink control channel (PDCCH)/an enhanced physical downlink control channel (EPDCCH) associated with a CRC scrambled by using a cell radio network temporary identifier (C-RNTI).

When the terminal device receives PDSCH data precoded in a transmit diversity manner on four cell-specific antenna ports, $\rho_A=P'_A+10 \log_{10}(2)$ [dB], otherwise $\rho_A=P'_A$ [dB].

$P'_A$ is given by using the parameter servCellp-a-r12, and servCellp-a-r12 may be used to indicate a power offset, of the C-RNTI, that is transmitted by a serving cell by using the PDSCH and that is modulated in a QPSK manner, and may be understood as a value of $P_A$ of the serving cell, and servCellp-a-r12 may be notified to the terminal device by using radio resource control (RRC) signaling.

A method for determining $\rho_B$ is as follows.

A cell-specific ratio $\rho_B/\rho_A$ may be determined based on Table 1, and a cell-specific parameter $P_B$ may be given by using higher layer signaling and a quantity of cell-specific antenna ports.

TABLE 1

| | $\rho_B/\rho_A$ | |
|---|---|---|
| $P_B$ | One antenna port | Two or four antenna ports |
| 0 | 1 | 5/4 |
| 1 | 4/5 | 1 |
| 2 | 3/5 | 3/4 |
| 3 | 2/5 | 1/2 |

A ratio of PDSCH EPRE to terminal device-specific reference signal EPRE is determined in the following manner.

In the TM 7, if a terminal device-specific reference signal exists on the PRB to which the PDSCH is mapped, the ratio of the PDSCH EPRE to the terminal device-specific reference signal EPRE is a fixed value on each orthogonal frequency division multiplexing (OFDM) symbol including the terminal device-specific reference signal, and the value remains unchanged on all OFDM symbols including the terminal device-specific reference signal on a corresponding PRB. For the 16 QAM, the 64 QAM, or the 256 QAM, the terminal device usually assumes the ratio to be 0 dB.

In the TM 8, if a terminal device-specific reference signal exists on the PRB to which the corresponding PDSCH is mapped, the terminal device makes an assumption in which the ratio of the PDSCH EPRE to the terminal device-specific reference signal EPRE is 0 dB on each OFDM symbol including the terminal device-specific reference signal.

In the TM 9 and the TM 10, if a terminal device-specific reference signal exists on the PRB to which the corresponding PDSCH is mapped, the terminal device makes an assumption in which if a quantity of transmission layers is less than or equal to 2, the ratio of the PDSCH EPRE to the terminal device-specific reference signal EPRE is 0 dB on each OFDM symbol including the terminal device-specific reference signal, otherwise, the ratio is −3 dB.

The terminal device-specific reference signal mentioned above may include a cell-level reference signal or a UE-level reference signal.

The following further describes the embodiments of the present invention in detail with reference to the accompanying drawings of this specification.

Figure 2:
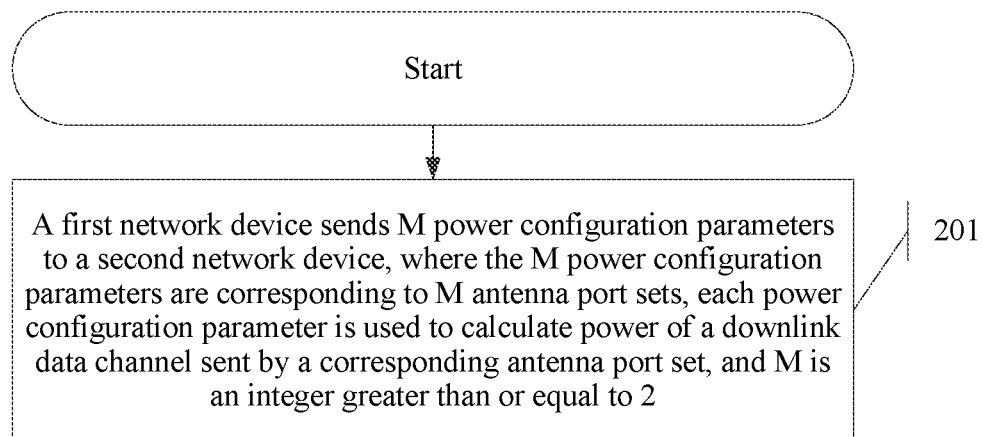
FIG. 2 is a possible flowchart of a power configuration method according to an embodiment of the present invention.

Referring to FIG. 2, a first power configuration method is provided. A procedure of the method is as follows.

Step S201. A first network device sends M power configuration parameters to a second network device, where the M power configuration parameters are corresponding to M antenna port sets, at least one of the M antenna port sets belongs to the first network device, each power configuration parameter is used to calculate power of a downlink data channel between a corresponding antenna port set and the second network device, and M is an integer greater than or equal to 2.

Figure 3:
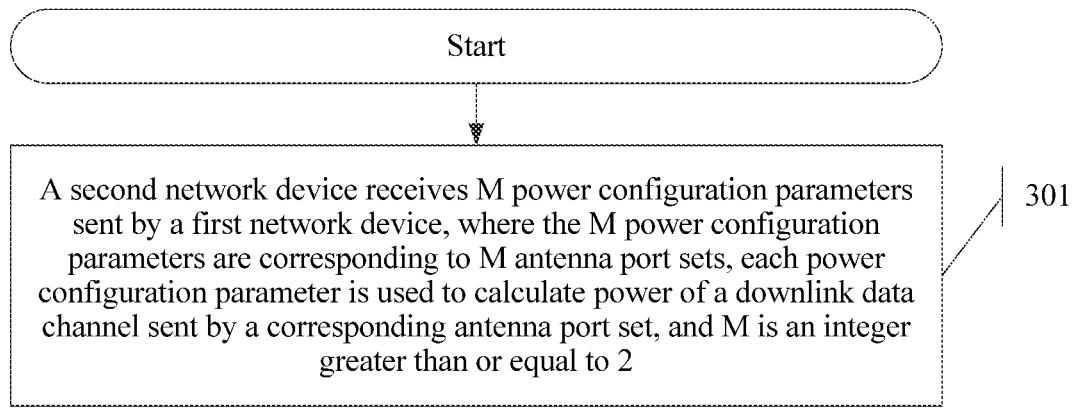
FIG. 3 is another possible flowchart of a power configuration method according to an embodiment of the present invention.

Referring to FIG. 3, a second power configuration method is provided. A procedure of the method is as follows.

Step S301. A second network device receives M power configuration parameters sent by a first network device, where the M power configuration parameters are corresponding to M antenna port sets, at least one of the M antenna port sets belongs to the first network device, each power configuration parameter is used to calculate power of a downlink data channel between a corresponding antenna port set and the second network device, and M is an integer greater than or equal to 2.

Optionally, the M antenna port sets may belong to different cells, or some of the M antenna port sets may belong to a same cell. For example, if a first cell includes two antenna port sets in the M antenna port sets, the first cell may be corresponding to two power configuration parameters. The two power configuration parameters may be the same, or may be different. To be specific, in this embodiment of the present invention, a power configuration parameter is configured based on an antenna port set instead of a carrier. A same carrier may be corresponding to a plurality of power configuration parameters, and the plurality of power configuration parameters corresponding to the same carrier may be the same, or may be different.

Optionally, for example, M is equal to 2, and the two antenna port sets belong to different base stations. For example, in a single link case, an antenna port set 1 belongs to a base station 1, and an antenna port set 2 belongs to a base station 2. For example, in a dual link case, an antenna port set 1 belongs to a base station 1, an antenna port set 2 belongs to a base station 2, and the antenna port set 1 and the antenna port set 2 perform coordinated transmission for a terminal device together. In this case, if one antenna port set is one cell, the antenna port set 1 may be considered as a coordinated cell of the antenna port set 2, and the antenna port set 2 may also be considered as a coordinated cell of the antenna port set 1.

Optionally, for example, M is equal to 2, and the two antenna port sets belong to a same base station. For example, in a single link case, an antenna port set 1 belongs to a base station 1, and an antenna port set 2 also belongs to the base station 1. For example, in a dual link case, an antenna port set 1 belongs to a base station 1, an antenna port set 2 also belongs to the base station 1, and the antenna port set 1 and the antenna port set 2 perform coordinated transmission for a terminal device together. In this case, if one antenna port set is one cell, the antenna port set 1 may be considered as a coordinated cell of the antenna port set 2, and the antenna port set 2 may also be considered as a coordinated cell of the antenna port set 1.

Optionally, for example, a first cell is corresponding to three power configuration parameters, and a second cell is corresponding to one power configuration parameter. One of the three power configuration parameters corresponding to the first cell may be the same as the power configuration parameter of the second cell, or none of the three power configuration parameters corresponding to the first cell is the same as the power configuration parameter corresponding to the second cell.

FIG. 2 and FIG. 3 describe corresponding methods that are described together below by using several examples. The following examples are mainly described by using an example in which the first network device is a base station, the second network device is a terminal device, and the downlink data channel is a PDSCH.

Figure 4:
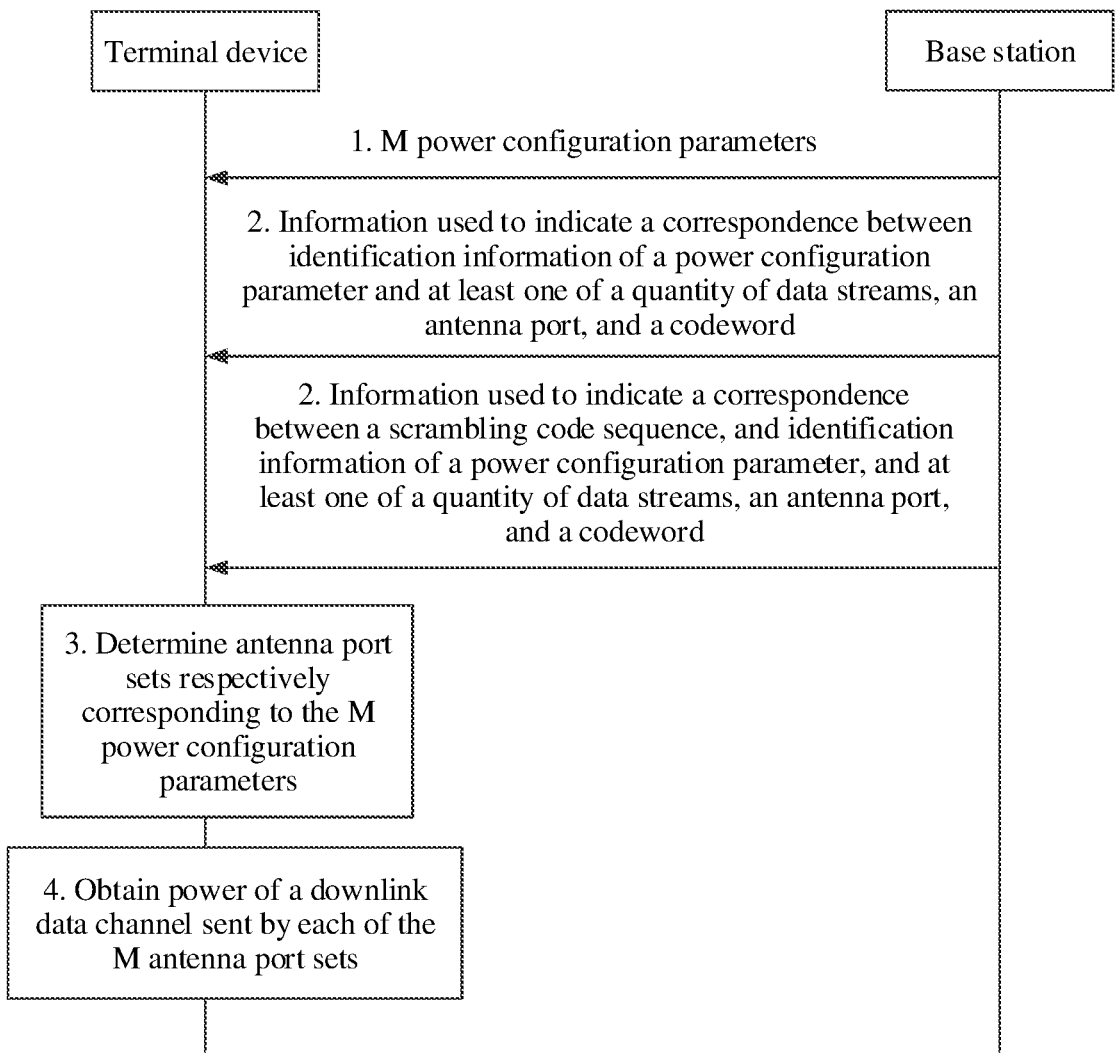
FIG. 4 is a flowchart of a first method for calculating power based on a power configuration parameter according to an embodiment of the present invention.

For an example 1, refer to FIG. 4.

1. The base station sends the M power configuration parameters to the terminal device by using higher layer signaling, and the terminal device may receive the M power configuration parameters sent by the base station.

Optionally, for example, the higher layer signaling may include RRC signaling or other possible higher layer signaling.

Optionally, the M power configuration parameters may be added by the base station to one piece of higher layer signaling and then sent to the terminal device, or the M power configuration parameters may be added to a plurality of pieces of higher layer signaling and then respectively sent to the terminal device. For example, if one antenna port set is considered as one cell, a power configuration parameter of a serving cell may be added by the base station to one piece of higher layer signaling and then sent to the terminal device, and a power configuration parameter of another cell may be added to another piece of higher layer signaling and then sent to the terminal device.

Optionally, if the antenna port sets corresponding to the M power configuration parameters belong to a same base station, the base station may directly obtain the M power configuration parameters and send the M power configuration parameters to the terminal device. However, if the antenna port sets corresponding to the M power configuration parameters belong to different base stations, a same base station may send the M power configuration parameters to the terminal device. For example, a base station in which a serving cell of the terminal device is located may send the M power configuration parameters to the terminal device. Alternatively, different base stations may respectively send corresponding power configuration parameters to the terminal device, provided that the M power configuration parameters are sent to the terminal device in total. Optionally, if a same base station sends the M power configuration parameters to the terminal device, the base station sending the power configuration parameters to the terminal device needs to obtain corresponding power configuration parameters from other base stations in advance.

For example, M is equal to 2, an antenna port set corresponding to one power configuration parameter 1 belongs to a base station 1, and an antenna port set corresponding to the other power configuration parameter 2 belongs to a base station 2. If the base station 1 sends the two power configuration parameters to the terminal device, the base station 1 needs to send the power configuration parameter 2 to the terminal device, and the base station 1 may request the base station 2 to obtain the power configuration parameter 2, for example, by using an X2 interface, or the base station 2 may actively send the power configuration parameter 2 to the base station 1. Alternatively, the base station 1 may send the power configuration parameter 1 to the terminal device, and the base station 2 sends the power configuration parameter 2 to the terminal device.

Optionally, if the M power configuration parameters are added to a plurality of pieces of higher layer signaling and then respectively sent to the terminal device, a time and a sequence of sending the M power configuration parameters are not limited in this embodiment of the present invention.

For example, if one antenna port set is considered as one cell, a power configuration parameter of a cell served by the base station may be added by the base station to one piece of higher layer signaling and then sent to the terminal device, and power configuration parameters of cells served by other base stations may be added by the base station to other pieces of higher layer signaling and then sent to the terminal device. This relates to a process in which the base station needs to obtain the corresponding power configuration parameters from the other base stations, to be specific, three processes in total. In a process 1, the power configuration parameter of the cell served by the base station is added by the base station to the one piece of higher layer signaling and then sent to the terminal device. In a process 2, the base station obtains the corresponding power configuration parameters from the other base stations. In a process 3, the power configuration parameters of the cells served by the other base stations are added by the base station to the other pieces of higher layer signaling and then sent to the terminal device. A sequence of performing the processes may be process 1-process 2-process 3 or process 2-process 1-process 3, or the process 1 and the process 2 are performed at the same time, and the process 3 is performed last, or the process 2 is performed first, and then the process 1 and the process 3 are performed, or another possible sequence may exist.

Optionally, each power configuration parameter may include reference signal power corresponding to the power configuration parameter, may include either of a first parameter and a second parameter, or may include another possible parameter. The reference signal power corresponding to the power configuration parameter may be used to indicate power of a cell-specific reference signal, for example, power of a CRS, or may be used to indicate power of a UE-specific reference signal, for example, power of a DMRS. Whether a power configuration parameter includes reference signal power used to indicate power of a cell-specific reference signal or reference signal power used to indicate power of a UE-specific reference signal may be preset in a protocol, or may be selected by the base station based on a requirement. This is not limited in this embodiment of the present invention. Optionally, in this embodiment of the present invention, each power configuration parameter may further include identification information used to identify the power configuration parameter, and the identification information may also be referred to as index information.

Identification information of a power configuration parameter may be used to identify a unique power configuration parameter. In other words, each power configuration parameter is corresponding to one piece of identification information, so that respective identification information can be used to distinguish between a plurality of power configuration parameters. For example, the first parameter is represented by p-b, and may be used to indicate a value of a parameter $P_B$, that is, a value of $\rho_B/\rho_A$, to be specific, a ratio of power of an antenna port set corresponding to the power configuration parameter when a cell-specific reference signal exists on a symbol to power of the antenna port set when no cell-specific reference signal exists on the symbol. Based on the foregoing description, $\rho_A$ may have different values in different TMs or in different scenarios of a same TM. Therefore, in different scenarios, a corresponding network device may configure the power configuration parameter in different manners, and the terminal device also needs to know values of $\rho_A$ in advance in different scenarios. In addition, for example, the second parameter is represented by p-a, and may be used to indicate a value of the parameter $P_A$. $P_A$ may be understood as a dedicated parameter used to calculate power of a downlink data channel between the antenna port set corresponding to the power configuration parameter and the terminal device. In other words, $P_A$ may be understood as a dedicated parameter used to calculate power of a downlink data channel between a transmission point corresponding to the power configuration parameter and the terminal device. Optionally, the dedicated parameter is usually notified by using higher layer signaling. After obtaining a power configuration parameter, the terminal device may obtain power of a downlink data channel between a corresponding antenna port set and the terminal device through calculation based on the power configuration parameter, that is, may obtain power of a downlink data channel between a corresponding transmission point and the terminal device through calculation based on the power configuration parameter. For a calculation manner, refer to the foregoing description.

2. The base station sends, to the terminal device by using a PDCCH/an EPDCCH, information used to indicate a correspondence between identification information of a power configuration parameter and at least one of a quantity of data streams, an antenna port, and a codeword. For example, the information used to indicate the correspondence between identification information of a power configuration parameter and at least one of a quantity of data streams, an antenna port, and a codeword may be added by the base station to control information and then delivered to the terminal device, and the terminal device may receive the information used to indicate the correspondence between identification information of a power configuration parameter and at least one of a quantity of data streams, an antenna port, and a codeword. Alternatively, the base station sends, to the terminal device by using a PDCCH/an EPDCCH, information used to indicate a correspondence between a scrambling code sequence, and identification information of a power configuration parameter and at least one of a quantity of data streams, an antenna port, and a codeword. For example, the information used to indicate the correspondence between a scrambling code sequence, and identification information of a power configuration parameter and at least one of a quantity of data streams, an antenna port, and a codeword may be added by the base station to control information and then delivered to the terminal device, and the terminal device may receive the information used to indicate the correspondence between a scrambling code sequence, and identification information of a power configuration parameter and at least one of a quantity of data streams, an antenna port, and a codeword. In other words, when indicating the power configuration parameter to the terminal device, the base station may indicate the scrambling code sequence together with the power configuration parameter, or may independently indicate the scrambling code sequence.

Optionally, if one base station sends the M power configuration parameters to the terminal device, the base station may send, to the terminal device, the information used to indicate the correspondence between identification information of a power configuration parameter and at least one of a quantity of data streams, an antenna port, and a codeword, or send, to the terminal device, the information used to indicate the correspondence between a scrambling code sequence, and identification information of a power configuration parameter and at least one of a quantity of data streams, an antenna port, and a codeword. The correspondence sent by the base station may cover a correspondence with each of the M power configuration parameters. If different base stations respectively send the power configuration parameters to the terminal device, a same base station may send, to the terminal device, the information used to indicate the correspondence between identification information of a power configuration parameter and at least one of a quantity of data streams, an antenna port, and a codeword, or send, to the terminal device, the information used to indicate the correspondence between a scrambling code sequence, and identification information of a power configuration parameter and at least one of a quantity of data streams, an antenna port, and a codeword, or the different base stations may respectively send, to the terminal device, the information used to indicate the correspondence between identification information of a power configuration parameter and at least one of a quantity of data streams, an antenna port, and a codeword, or send, to the terminal device, the information used to indicate the correspondence between a scrambling code sequence, and identification information of a power configuration parameter and at least one of a quantity of data streams, an antenna port, and a codeword. When the different base stations send the information used to indicate the correspondence, each base station may send only information used to indicate a correspondence with a power configuration parameter corresponding to the base station. Optionally, if different base stations send the information used to indicate the correspondence, and if a specific base station sends only one power configuration parameter to the terminal device, the base station may not need to send, to the terminal device, the information used to indicate the correspondence. This is because there is only one power configuration parameter, and the terminal device may determine a corresponding antenna port set based on the base station sending the power configuration parameter. An example in which one base station sends the M power configuration parameters to the terminal device, and the base station sends the correspondence to the terminal device is used in FIG. 4.

Optionally, the information used to indicate the correspondence between identification information of a power configuration parameter and at least one of a quantity of data streams, an antenna port, and a codeword may include at least one piece of sub-information used to indicate at least one of a quantity of data streams, an antenna port, and a codeword. Each piece of sub-information may include identification information of a corresponding power configuration parameter. In other words, it may be understood that the information used to indicate the correspondence between identification information of a power configuration parameter and at least one of a quantity of data streams, an antenna port, and a codeword may include a plurality of pieces of sub-information. Each piece of sub-information is used to indicate a correspondence between identification information of a power configuration parameter and at least one of a quantity of data streams, an antenna port, and a codeword. Likewise, the information used to indicate the correspondence between a scrambling code sequence, and identification information of a power configuration parameter and at least one of a quantity of data streams, an antenna port, and a codeword may also include a plurality of pieces of sub-information. Each piece of sub-information is used to indicate a correspondence between a scrambling code sequence, and identification information of a power configuration parameter and at least one of a quantity of data streams, an antenna port, and a codeword.

In this embodiment of the present invention, the sub-information may also be referred to as a state. Optionally, the base station may send, to the terminal device by using downlink control information (DCI), the information used to indicate the correspondence between identification information of a power configuration parameter and at least one of a quantity of data streams, an antenna port, and a codeword. Optionally, the base station may send, to the terminal device by using DCI, the information used to indicate the correspondence between a scrambling code sequence, and identification information of a power configuration parameter and at least one of a quantity of data streams, an antenna port, and a codeword.

That no scrambling code sequence is indicated is used as an example first. In other words, an example of the information used to indicate the correspondence between identification information of a power configuration parameter and at least one of a quantity of data streams, an antenna port, and a codeword is as follows.

Optionally, for example, when a quantity of data streams is 1, for possible information used to indicate a correspondence between identification information of a power configuration parameter and at least one of a quantity of data streams, an antenna port, and a codeword, refer to Table 2A. Table 2A shows information used to indicate a correspondence between a quantity of data streams, an antenna port, and identification information of a power configuration parameter. In Table 2A, each value (Value) is corresponding to one piece of sub-information (Message), or the message may also be understood as a state. In other words, one value is corresponding to one state. This means that identification information of a power configuration parameter and at least one of a quantity of data streams, an antenna port, and a codeword are jointly encoded. For an encoding rule in this embodiment of the present invention, refer to the prior art. For example, a magnitude of the value may occupy two bits, three bits, or more bits. An example in which the magnitude of the value occupies two bits is used in Table 2A. A value 0 is corresponding to 00, a value 1 is corresponding to 01, a value 2 is corresponding to 10, and a value 3 is corresponding to 11. In the following table to be described, $n_{PCID}$ represents identification information of a power configuration parameter.

TABLE 2A

| Value | Message |
|---|---|
| 0 | 1 layer, port 7, $n_{PCID} = 0$ |
| 1 | 1 layer, port 7, $n_{PCID} = 1$ |
| 2 | 1 layer, port 7, $n_{PCID} = 2$ |
| 3 | 1 layer, port 7, $n_{PCID} = 3$ |

It may be learned from Table 2A that, when the quantity of data streams is 1, there are four corresponding states, and none of the four states is corresponding to same identification information of a power configuration parameter. It indicates that the four states are corresponding to four power configuration parameters. In this way, the terminal device already receives the M power configuration parameters in step 1, and also knows identification information of each power configuration parameter. Therefore, the terminal device may determine, based on information such as an antenna port in an antenna port set and/or the quantity of data streams, and identification information of a power configuration parameter that is included in each state, a correspondence between an antenna port set and a power configuration parameter, so as to obtain power of a downlink data channel between each antenna port set and the terminal device.

Alternatively, for example, when a quantity of data streams is 1, for other possible information used to indicate a correspondence between identification information of a power configuration parameter and at least one of a quantity of data streams, an antenna port, and a codeword, refer to Table 2B. Table 2B shows information used to indicate a correspondence between a quantity of data streams, an antenna port, and identification information of a power configuration parameter. In Table 2B, each value is corresponding to one state. An example in which a magnitude of the value occupies three bits is used in Table 2B. A value 0 is corresponding to 000, a value 1 is corresponding to 001, a value 2 is corresponding to 010, and so on.

TABLE 2B

| Value | Message |
|---|---|
| 0 | 1 layer, port 7, $n_{PCID}$ = 0 |
| 1 | 1 layer, port 7, $n_{PCID}$ = 1 |
| 2 | 1 layer, port 7, $n_{PCID}$ = 2 |
| 3 | 1 layer, port 7, $n_{PCID}$ = 3 |
| 4 | 1 layer, port 8, $n_{PCID}$ = 0 |
| 5 | 1 layer, port 8, $n_{PCID}$ = 1 |
| 6 | 1 layer, port 8, $n_{PCID}$ = 2 |
| 7 | 1 layer, port 8, $n_{PCID}$ = 3 |

It may be learned from Table 2B that, when the quantity of data streams is 1, there are eight corresponding states, and each of the eight states is corresponding to identification information of a power configuration parameter.

Optionally, for example, when a quantity of data streams is 2, for possible information used to indicate a correspondence between identification information of a power configuration parameter and at least one of a quantity of data streams, an antenna port, and a codeword, refer to Table 3. Table 3 shows information used to indicate a correspondence between a quantity of data streams, an antenna port, and identification information of a power configuration parameter. In Table 3, each value is corresponding to one state. An example in which a magnitude of the value occupies two bits is used in Table 3.

TABLE 3

| Value | Message |
|---|---|
| 0 | 2 layers, port 7, $n_{PCID}$ = 0 |
|   | 2 layers, port 8, $n_{PCID}$ = 0 |
| 1 | 2 layers, port 7, $n_{PCID}$ = 0 |
|   | 2 layers, port 8, $n_{PCID}$ = 1 |
| 2 | 2 layers, port 7, $n_{PCID}$ = 0 |
|   | 2 layers, port 8, $n_{PCID}$ = 2 |
| 3 | 2 layers, port 7, $n_{PCID}$ = 0 |
|   | 2 layers, port 8, $n_{PCID}$ = 3 |

It may be learned from Table 3 that, when the quantity of data streams is 2, there are four corresponding states, and none of the four states is corresponding to same identification information of a power configuration parameter. It indicates that the four states are corresponding to four power configuration parameters.

Optionally, for example, when a quantity of data streams is 3, for possible information used to indicate a correspondence between identification information of a power configuration parameter and at least one of a quantity of data streams, an antenna port, and a codeword, refer to Table 4. Table 4 shows information used to indicate a correspondence between a quantity of data streams, an antenna port, and identification information of a power configuration parameter. In Table 4, each value is corresponding to one state, each state may further include at least two sub-states, and each sub-state may be corresponding to $n_{PCID}$. An example in which a magnitude of the value occupies three bits is used in Table 4.

TABLE 4

| Value | Message |
|---|---|
| 0 | 3 layers, ports 7 and 8, $n_{PCID}$ = 0 |
|   | 3 layers, port 9, $n_{PCID}$ = 0 |
| 1 | 3 layers, ports 7 and 8, $n_{PCID}$ = 0 |
|   | 3 layers, port 9, $n_{PCID}$ = 1 |
| 2 | 3 layers, ports 7 and 8, $n_{PCID}$ = 0 |
|   | 3 layers, port 9, $n_{PCID}$ = 2 |
| 3 | 3 layers, ports 7 and 8, $n_{PCID}$ = 1 |
|   | 3 layers, port 9, $n_{PCID}$ = 2 |
| 4 | 3 layers, port 7, $n_{PCID}$ = 0 |
|   | 3 layers, ports 8 and 9, $n_{PCID}$ = 0 |
| 5 | 3 layers, port 7, $n_{PCID}$ = 0 |
|   | 3 layers, ports 8 and 9, $n_{PCID}$ = 1 |
| 6 | 3 layers, port 7, $n_{PCID}$ = 0 |
|   | 3 layers, ports 8 and 9, $n_{PCID}$ = 2 |
| 7 | 3 layers, port 7, $n_{PCID}$ = 1 |
|   | 3 layers, ports 8 and 9, $n_{PCID}$ = 2 |

It may be learned from Table 4 that, when the quantity of data streams is 3, there are 16 corresponding sub-states, and each of the 16 sub-states is corresponding to identification information of a power configuration parameter.

Optionally, for example, when a quantity of data streams is 4, for possible information used to indicate a correspondence between identification information of a power configuration parameter and at least one of a quantity of data streams, an antenna port, and a codeword, refer to Table 5. Table 5 shows information used to indicate a correspondence between a quantity of data streams, an antenna port, and identification information of a power configuration parameter. In Table 5, each value is corresponding to one state, each state may further include at least two sub-states, and each sub-state may be corresponding to $n_{PCID}$. An example in which a magnitude of the value occupies three bits is used in Table 5.

TABLE 5

| Value | Message |
|---|---|
| 0 | 4 layers, ports 7 and 8, $n_{PCID}$ = 0 |
|   | 4 layers, ports 9 and 10, $n_{PCID}$ = 0 |
| 1 | 4 layers, ports 7 and 8, $n_{PCID}$ = 0 |
|   | 4 layers, ports 9 and 10, $n_{PCID}$ = 1 |
| 2 | 4 layers, ports 7 and 8, $n_{PCID}$ = 0 |
|   | 4 layers, ports 9 and 10, $n_{PCID}$ = 2 |
| 3 | 4 layers, ports 7 and 8, $n_{PCID}$ = 0 |
|   | 4 layers, ports 9 and 10, $n_{PCID}$ = 3 |
| 4 | 4 layers, ports 7 and 8, $n_{PCID}$ = 1 |
|   | 4 layers, ports 9 and 10, $n_{PCID}$ = 2 |
| 5 | 4 layers, ports 7 to 9, $n_{PCID}$ = 0 |
|   | 4 layers, port 10, $n_{PCID}$ = 1 |
| 6 | 4 layers, ports 7 to 9, $n_{PCID}$ = 0 |
|   | 4 layers, port 10, $n_{PCID}$ = 2 |
| 7 | 4 layers, port 7, $n_{PCID}$ = 1 |
|   | 4 layers, ports 8 to 10, $n_{PCID}$ = 2 |

It may be learned from Table 5 that, when the quantity of data streams is 4, there are 16 corresponding sub-states, and each of the 16 sub-states is corresponding to identification information of a power configuration parameter.

Optionally, for example, when a quantity of data streams is 5, for possible information used to indicate a correspondence between identification information of a power configuration parameter and at least one of a quantity of data streams, an antenna port, and a codeword, refer to Table 6. Table 6 shows information used to indicate a correspondence between a quantity of data streams, an antenna port, and identification information of a power configuration parameter. In Table 6, each value is corresponding to one state, each state may further include at least two sub-states, and each sub-state may be corresponding to $n_{PCID}$. An example in which a magnitude of the value occupies three bits is used in Table 6.

TABLE 6

| Value | Message |
|---|---|
| 0 | 5 layers, ports 7 and 8, $n_{PCID} = 0$ |
|   | 5 layers, ports 9 to 11, $n_{PCID} = 0$ |
| 1 | 5 layers, ports 7 and 8, $n_{PCID} = 0$ |
|   | 5 layers, ports 9 to 11, $n_{PCID} = 1$ |
| 2 | 5 layers, ports 7 and 8, $n_{PCID} = 0$ |
|   | 5 layers, ports 9 to 11, $n_{PCID} = 2$ |
| 3 | 5 layers, ports 7 and 8, $n_{PCID} = 1$ |
|   | 5 layers, ports 9 to 11, $n_{PCID} = 2$ |
| 4 | 5 layers, ports 7 to 9, $n_{PCID} = 0$ |
|   | 5 layers, ports 10 and 11, $n_{PCID} = 1$ |
| 5 | 5 layers, ports 7 to 9, $n_{PCID} = 0$ |
|   | 5 layers, ports 10 and 11, $n_{PCID} = 2$ |
| 6 | 5 layers, ports 7 to 9, $n_{PCID} = 0$ |
|   | 5 layers, ports 10 and 11, $n_{PCID} = 3$ |
| 7 | 5 layers, ports 7 to 9, $n_{PCID} = 1$ |
|   | 5 layers, ports 10 and 11, $n_{PCID} = 2$ |

It may be learned from Table 6 that, when the quantity of data streams is 5, there are 16 corresponding sub-states, and each of the 16 sub-states is corresponding to identification information of a power configuration parameter.

Optionally, for example, when a quantity of data streams is 6, for possible information used to indicate a correspondence between identification information of a power configuration parameter and at least one of a quantity of data streams, an antenna port, and a codeword, refer to Table 7. Table 7 shows information used to indicate a correspondence between a quantity of data streams, an antenna port, and identification information of a power configuration parameter. In Table 7, each value is corresponding to one state, each state may further include at least two sub-states, and each sub-state may be corresponding to $n_{PCID}$. An example in which a magnitude of the value occupies three bits is used in Table 7.

TABLE 7

| Value | Message |
|---|---|
| 0 | 6 layers, ports 7 to 9, $n_{PCID} = 0$ |
|   | 6 layers, ports 10 to 12, $n_{PCID} = 0$ |
| 1 | 6 layers, ports 7 to 9, $n_{PCID} = 0$ |
|   | 6 layers, ports 10 to 12, $n_{PCID} = 1$ |
| 2 | 6 layers, ports 7 to 9, $n_{PCID} = 0$ |
|   | 6 layers, ports 10 to 12, $n_{PCID} = 2$ |
| 3 | 6 layers, ports 7 to 9, $n_{PCID} = 1$ |
|   | 6 layers, ports 10 to 12, $n_{PCID} = 2$ |
| 4 | 6 layers, ports 7 to 9, $n_{PCID} = 0$ |
|   | 6 layers, ports 10 to 12, $n_{PCID} = 3$ |
| 5 | 6 layers, ports 7 to 9, $n_{PCID} = 1$ |
|   | 6 layers, ports 10 to 12, $n_{PCID} = 3$ |
| 6 | 6 layers, ports 7 to 9, $n_{PCID} = 2$ |
|   | 6 layers, ports 10 to 12, $n_{PCID} = 3$ |
| 7 | 6 layers, ports 7 to 9, $n_{PCID} = 1$ |
|   | 6 layers, ports 10 to 12, $n_{PCID} = 1$ |

It may be learned from Table 7 that, when the quantity of data streams is 6, there are 16 corresponding sub-states, and each of the 16 sub-states is corresponding to identification information of a power configuration parameter.

Optionally, for example, when a quantity of data streams is 7, for possible information used to indicate a correspondence between identification information of a power configuration parameter and at least one of a quantity of data streams, an antenna port, and a codeword, refer to Table 8. Table 8 shows information used to indicate a correspondence between a quantity of data streams, an antenna port, and identification information of a power configuration parameter. In Table 8, each value is corresponding to one state, each state may further include at least two sub-states, and each sub-state may be corresponding to $n_{PCID}$. An example in which a magnitude of the value occupies three bits is used in Table 8.

TABLE 8

| Value | Message |
|---|---|
| 0 | 7 layers, ports 7 to 9, $n_{PCID} = 0$ |
|   | 7 layers, ports 10 to 13, $n_{PCID} = 0$ |
| 1 | 7 layers, ports 7 to 9, $n_{PCID} = 0$ |
|   | 7 layers, ports 10 to 13, $n_{PCID} = 1$ |
| 2 | 7 layers, ports 7 to 9, $n_{PCID} = 0$ |
|   | 7 layers, ports 10 to 13, $n_{PCID} = 2$ |
| 3 | 7 layers, ports 7 to 9, $n_{PCID} = 1$ |
|   | 7 layers, ports 10 to 13, $n_{PCID} = 2$ |
| 4 | 7 layers, ports 7 to 10, $n_{PCID} = 0$ |
|   | 7 layers, ports 11 to 13, $n_{PCID} = 1$ |
| 5 | 7 layers, ports 7 to 10, $n_{PCID} = 0$ |
|   | 7 layers, ports 11 to 13, $n_{PCID} = 2$ |
| 6 | 7 layers, ports 7 to 10, $n_{PCID} = 0$ |
|   | 7 layers, ports 11 to 13, $n_{PCID} = 3$ |
| 7 | 7 layers, ports 7 to 10, $n_{PCID} = 1$ |
|   | 7 layers, ports 11 to 13, $n_{PCID} = 2$ |

It may be learned from Table 8 that, when the quantity of data streams is 7, there are 16 corresponding sub-states, and each of the 16 sub-states is corresponding to identification information of a power configuration parameter.

Optionally, for example, when a quantity of data streams is 8, for possible information used to indicate a correspondence between identification information of a power configuration parameter and at least one of a quantity of data streams, an antenna port, and a codeword, refer to Table 9. Table 9 shows information used to indicate a correspondence between a quantity of data streams, an antenna port, and identification information of a power configuration parameter. In Table 9, each value is corresponding to one state, each state may further include at least two sub-states, and each sub-state may be corresponding to $n_{PCID}$. An example in which a magnitude of the value occupies three bits is used in Table 9.

TABLE 9

| Value | Message |
|---|---|
| 0 | 8 layers, ports 7 to 10, $n_{PCID} = 0$ |
|   | 8 layers, ports 11 to 14, $n_{PCID} = 0$ |
| 1 | 8 layers, ports 7 to 10, $n_{PCID} = 0$ |
|   | 8 layers, ports 11 to 14, $n_{PCID} = 1$ |
| 2 | 8 layers, ports 7 to 10, $n_{PCID} = 0$ |
|   | 8 layers, ports 11 to 14, $n_{PCID} = 2$ |
| 3 | 8 layers, ports 7 to 10, $n_{PCID} = 1$ |
|   | 8 layers, ports 11 to 14, $n_{PCID} = 2$ |
| 4 | 8 layers, ports 7 to 10, $n_{PCID} = 1$ |
|   | 8 layers, ports 11 to 14, $n_{PCID} = 1$ |
| 5 | 8 layers, ports 7 to 10, $n_{PCID} = 2$ |
|   | 8 layers, ports 11 to 14, $n_{PCID} = 2$ |

TABLE 9-continued

| Value | Message |
|---|---|
| 6 | 8 layers, ports 7 to 10, $n_{PCID} = 0$<br>8 layers, ports 11 to 14, $n_{PCID} = 3$ |
| 7 | 8 layers, ports 7 to 10, $n_{PCID} = 1$<br>8 layers, ports 11 to 14, $n_{PCID} = 3$ |

It may be learned from Table 9 that, when the quantity of data streams is 8, there are 16 corresponding sub-states, and each of the 16 sub-states is corresponding to identification information of a power configuration parameter.

Table 2A to Table 9 shown above show cases in which different quantities of data streams may be respectively indicated. Optionally, cases of various quantities of data streams may be indicated together. In this indication manner, for example, possible information used to indicate a correspondence between identification information of a power configuration parameter and at least one of a quantity of data streams, an antenna port, and a codeword is shown in Table 10. Table 10 shows information used to indicate a correspondence between a quantity of data streams, an antenna port, and identification information of a power configuration parameter.

TABLE 10

| Value | Message |
|---|---|
| 0 | 1 layer, port 7, $n_{PCID} = 0$ |
| 1 | 1 layer, port 8, $n_{PCID} = 1$ |
| 2 | 2 layers, port 7, $n_{PCID} = 0$<br>2 layers, port 8, $n_{PCID} = 1$ |
| 3 | 2 layers, port 7, $n_{PCID} = 0$<br>2 layers, port 8, $n_{PCID} = 2$ |
| 4 | 3 layers, ports 7 and 8, $n_{PCID} = 0$<br>3 layers, port 9, $n_{PCID} = 1$ |
| 5 | 4 layers, ports 7 and 8, $n_{PCID} = 0$<br>4 layers, ports 9 and 10, $n_{PCID} = 1$ |
| 6 | 5 layers, ports 7 to 11, $n_{PCID} = 2$ |
| 7 | 8 layers, ports 7 to 14, $n_{PCID} = 3$ |
| ... | ... |

The information used to indicate the correspondence between a quantity of data streams, an antenna port, and identification information of a power configuration parameter is used as an example in each of Table 2A to Table 10. The following further illustrates information used to indicate a correspondence between a quantity of data streams and identification information of a power configuration parameter and information used to indicate a correspondence between an antenna port and identification information of a power configuration parameter.

Optionally, for example, for possible information used to indicate a correspondence between a quantity of data streams and identification information of a power configuration parameter, refer to Table 11. In Table 11, each value is corresponding to one state, each of some states thereof may further include at least two sub-states, and each sub-state may be corresponding to $n_{PCID}$. An example in which a magnitude of the value occupies three bits is used in Table 11. In addition, an example in which a quantity of data streams is 1 or 2 is used in Table 11.

TABLE 11

| Value | Message |
|---|---|
| 0 | Layer 1, $n_{PCID} = 0$ |
| 1 | Layer 1, $n_{PCID} = 1$ |

TABLE 11-continued

| Value | Message |
|---|---|
| 2 | Layer 1, $n_{PCID} = 2$ |
| 3 | Layer 1, $n_{PCID} = 0$<br>Layer 2, $n_{PCID} = 0$ |
| 4 | Layer 1, $n_{PCID} = 1$<br>Layer 2, $n_{PCID} = 1$ |
| 5 | Layer 1, $n_{PCID} = 0$<br>Layer 2, $n_{PCID} = 1$ |
| 6 | Layer 1, $n_{PCID} = 0$<br>Layer 2, $n_{PCID} = 2$ |
| 7 | Layer 1, $n_{PCID} = 1$<br>Layer 2, $n_{PCID} = 2$ |

Optionally, for example, for other possible information used to indicate a correspondence between a quantity of data streams and identification information of a power configuration parameter, refer to Table 12. In Table 12, each value is corresponding to one state, each of some states thereof may further include at least two sub-states, and each sub-state may be corresponding to $n_{PCID}$. An example in which a magnitude of the value occupies three bits is used in Table 12. In addition, an example in which a quantity of data streams is 1, 2, 3, or 4 is used in Table 12.

TABLE 12

| Value | Message |
|---|---|
| 0 | Layers 1, 2, 3, and 4, $n_{PCID} = 0$ |
| 1 | Layers 1, 2, 3, and 4, $n_{PCID} = 1$ |
| 2 | Layers 1, 2, 3, and 4, $n_{PCID} = 2$ |
| 3 | Layers 1 and 2, $n_{PCID} = 0$<br>Layers 3 and 4, $n_{PCID} = 1$ |
| 4 | Layers 1 and 2, $n_{PCID} = 0$<br>Layers 3 and 4, $n_{PCID} = 2$ |
| 5 | Layers 1 and 2, $n_{PCID} = 1$<br>Layers 3 and 4, $n_{PCID} = 2$ |
| 6 | Layer 1, $n_{PCID} = 0$<br>Layers 2, 3, and 4, $n_{PCID} = 2$ |
| 7 | Layer 1, $n_{PCID} = 1$<br>Layers 2, 3, and 4, $n_{PCID} = 2$ |

Optionally, for example, for possible information used to indicate a correspondence between an antenna port and identification information of a power configuration parameter, refer to Table 13. In Table 13, each value is corresponding to one state, each of some states thereof may further include at least two sub-states, and each sub-state may be corresponding to $n_{PCID}$. An example in which a magnitude of the value occupies three bits is used in Table 13. In addition, an example in which there are two antenna ports is used in Table 13.

TABLE 13

| Value | Message |
|---|---|
| 0 | Port 7, $n_{PCID} = 0$ |
| 1 | Port 7, $n_{PCID} = 1$ |
| 2 | Port 7, $n_{PCID} = 2$ |
| 3 | Port 7, $n_{PCID} = 0$<br>Port 8, $n_{PCID} = 0$ |
| 4 | Port 7, $n_{PCID} = 1$<br>Port 8, $n_{PCID} = 1$ |
| 5 | Port 7, $n_{PCID} = 0$<br>Port 8, $n_{PCID} = 1$ |
| 6 | Port 7, $n_{PCID} = 0$<br>Port 8, $n_{PCID} = 2$ |
| 7 | Port 7, $n_{PCID} = 1$<br>Port 8, $n_{PCID} = 2$ |

Optionally, for example, for other possible information used to indicate a correspondence between an antenna port and identification information of a power configuration parameter, refer to Table 14. In Table 14, each value is corresponding to one state, each of some states thereof may further include at least two sub-states, and each sub-state may be corresponding to $n_{PCID}$. An example in which a magnitude of the value occupies three bits is used in Table 14. In addition, an example in which there are four antenna ports is used in Table 14.

TABLE 14

| Value | Message |
|---|---|
| 0 | Ports 7, 8, 9, and 10, $n_{PCID} = 0$ |
| 1 | Ports 7, 8, 9, and 10, $n_{PCID} = 1$ |
| 2 | Port 7, $n_{PCID} = 0$ |
|   | Ports 8, 9, and 10, $n_{PCID} = 1$ |
| 3 | Port 7, $n_{PCID} = 0$ |
|   | Ports 8, 9, and 10, $n_{PCID} = 2$ |
| 4 | Port 7, $n_{PCID} = 1$ |
|   | Ports 8, 9, and 10, $n_{PCID} = 2$ |
| 5 | Ports 7 and 8, $n_{PCID} = 0$ |
|   | Ports 9 and 10, $n_{PCID} = 1$ |
| 6 | Ports 7 and 8, $n_{PCID} = 0$ |
|   | Ports 9 and 10, $n_{PCID} = 2$ |
| 7 | Ports 7 and 8, $n_{PCID} = 1$ |
|   | Ports 9 and 10, $n_{PCID} = 2$ |

Optionally, a codeword is not considered in the several types of information that are used to indicate a correspondence between identification information of a power configuration parameter and at least one of a quantity of data streams, an antenna port, and a codeword and that are described in the foregoing tables. The following illustrates cases in which a codeword is considered.

Optionally, for example, for possible information used to indicate a correspondence between a codeword and identification information of a power configuration parameter, refer to Table 15. Each value is corresponding to one piece of sub-information, namely, one state, each state may further include at least two sub-states, and each sub-state may be corresponding to $n_{PCID}$. A magnitude of the value may occupy two bits, three bits, or more bits. An example in which the magnitude of the value occupies two bits is used in Table 15.

TABLE 15

| Value | Message |
|---|---|
| 0 | Codeword 0, $n_{PCID} = 0$ |
|   | Codeword 1, $n_{PCID} = 0$ |
| 1 | Codeword 0, $n_{PCID} = 0$ |
|   | Codeword 1, $n_{PCID} = 1$ |
| 2 | Codeword 0, $n_{PCID} = 0$ |
|   | Codeword 1, $n_{PCID} = 2$ |
| 3 | Codeword 0, $n_{PCID} = 0$ |
|   | Codeword 1, $n_{PCID} = 3$ |

Alternatively, for example, for other possible information used to indicate a correspondence between a codeword and identification information of a power configuration parameter, refer to Table 16. Each value is corresponding to one state, each state may further include at least two sub-states, and each sub-state may be corresponding to $n_{PCID}$. An example in which a magnitude of the value occupies three bits is used in Table 16.

TABLE 16

| Value | Message |
|---|---|
| 0 | Codeword 0, $n_{PCID} = 0$ |
|   | Codeword 1, $n_{PCID} = 0$ |
| 1 | Codeword 0, $n_{PCID} = 0$ |
|   | Codeword 1, $n_{PCID} = 1$ |
| 2 | Codeword 0, $n_{PCID} = 0$ |
|   | Codeword 1, $n_{PCID} = 2$ |
| 3 | Codeword 0, $n_{PCID} = 0$ |
|   | Codeword 1, $n_{PCID} = 3$ |
| 4 | Codeword 0, $n_{PCID} = 1$ |
|   | Codeword 1, $n_{PCID} = 1$ |
| 5 | Codeword 0, $n_{PCID} = 1$ |
|   | Codeword 1, $n_{PCID} = 2$ |
| 6 | Codeword 0, $n_{PCID} = 1$ |
|   | Codeword 1, $n_{PCID} = 3$ |
| 7 | Codeword 0, $n_{PCID} = 2$ |
|   | Codeword 1, $n_{PCID} = 3$ |

Optionally, the following further describes a case in which a quantity of data streams, an antenna port, a codeword, and a scrambling code sequence are all considered. For example, for possible information used to indicate a correspondence between identification information of a power configuration parameter and at least one of a quantity of data streams, an antenna port, and a codeword, refer to Table 17. Table 17 shows information used to indicate a correspondence between a quantity of data streams, an antenna port, a codeword, a scrambling code sequence, and identification information of a power configuration parameter. In Table 17, each value is corresponding to one state, and each state may be corresponding to $n_{PCID}$. An example in which a magnitude of the value occupies three bits is used in Table 17.

TABLE 17

| One codeword: Codeword 0 enabled, and Codeword 1 disabled | | Two codewords: Codeword 0 enabled, and Codeword 1 enabled | |
|---|---|---|---|
| Value | Message | Value | Message |
| 0 | 1 layer, port 7, $n_{SCID} = 0$, $n_{PCID} = 0$ | 0 | 2 layers, ports 7 and 8, $n_{SCID} = 0$, $n_{PCID} = 0$ |
| 1 | 1 layer, port 7, $n_{SCID} = 1$, $n_{PCID} = 1$ | 1 | 2 layers, ports 7 and 8, $n_{SCID} = 1$, $n_{PCID} = 1$ |
| 2 | 1 layer, port 8, $n_{SCID} = 0$, $n_{PCID} = 0$ | 2 | 3 layers, ports 7 to 9, $n_{PCID} = 1$ |
| 3 | 1 layer, port 8, $n_{SCID} = 1$, $n_{PCID} = 1$ | 3 | 4 layers, ports 7 to 10, $n_{PCID} = 1$ |
| 4 | 2 layers, ports 7 and 8, $n_{PCID} = 1$ | 4 | 5 layers, ports 7 to 11, $n_{PCID} = 1$ |
| 5 | 3 layers, ports 7 to 9, $n_{PCID} = 1$ | 5 | 6 layers, ports 7 to 12, $n_{PCID} = 1$ |
| 6 | 4 layers, ports 7 to 10, $n_{PCID} = 1$ | 6 | 7 layers, ports 7 to 13, $n_{PCID} = 1$ |
| 7 | Reserved | 7 | 8 layers, ports 7 to 14, $n_{PCID} = 1$ |

Alternatively, for example, for other possible information used to indicate a correspondence between identification information of a power configuration parameter and at least one of a quantity of data streams, an antenna port, and a codeword, refer to Table 18. Table 18 shows information used to indicate a correspondence between a quantity of data streams, an antenna port, a codeword, a scrambling code sequence, and identification information of a power configuration parameter. In Table 18, each value is corresponding to one state, and each state may be corresponding to $n_{PCID}$. An example in which a magnitude of the value occupies four bits is used in Table 18. A value 0 is corresponding to 0000, a value 1 is corresponding to 0001, a value 2 is corresponding to 0010, and so on.

TABLE 18

| One codeword: Codeword 0 enabled, and Codeword 1 disabled | | Two codewords: Codeword 0 enabled, and Codeword 1 enabled | |
| --- | --- | --- | --- |
| Value | Message | Value | Message |
| 0 | 1 layer, port 7, $n_{SCID} = 0$, $n_{PCID} = 0$ | 0 | 2 layers, port 7, $n_{SCID} = 0$, $n_{PCID} = 0$<br>2 layers, port 8, $n_{SCID} = 0$, $n_{PCID} = 0$ |
| 1 | 1 layer, port 7, $n_{SCID} = 1$, $n_{PCID} = 1$ | 1 | 2 layers, port 7, $n_{SCID} = 1$, $n_{PCID} = 0$<br>2 layers, port 8, $n_{SCID} = 1$, $n_{PCID} = 1$ |
| 2 | 1 layer, port 8, $n_{SCID} = 0$, $n_{PCID} = 0$ | 2 | 2 layers, port 7, $n_{SCID} = 1$, $n_{PCID} = 0$<br>2 layers, port 8, $n_{SCID} = 1$, $n_{PCID} = 2$ |
| 3 | 1 layer, port 8, $n_{SCID} = 1$, $n_{PCID} = 1$ | 3 | 2 layers, port 7, $n_{SCID} = 1$, $n_{PCID} = 1$<br>2 layers, port 8, $n_{SCID} = 1$, $n_{PCID} = 2$ |
| 4 | 2 layers, port 7, $n_{PCID} = 0$<br>2 layers, port 8, $n_{PCID} = 0$ | 4 | 3 layers, ports 7 and 8, $n_{PCID} = 0$<br>3 layers, port 9, $n_{PCID} = 0$ |
| 5 | 2 layers, port 7, $n_{PCID} = 0$<br>2 layers, port 8, $n_{PCID} = 1$ | 5 | 3 layers, ports 7, $n_{PCID} = 0$<br>3 layers, ports 8 and 9, $n_{PCID} = 1$ |
| 6 | 2 layers, port 9, $n_{PCID} = 0$<br>2 layers, ports 10, $n_{PCID} = 0$ | 6 | 4 layers, ports 7 and 8, $n_{PCID} = 0$<br>4 layers, ports 9 and 10, $n_{PCID} = 0$ |
| 7 | 2 layers, port 9, $n_{PCID} = 0$<br>2 layers, ports 10, $n_{PCID} = 1$ | 7 | 4 layers, ports 7 and 8, $n_{PCID} = 0$<br>4 layers, ports 9 and 10, $n_{PCID} = 1$ |
| 8 | 3 layers, ports 7 and 8, $n_{PCID} = 0$<br>3 layers, port 9, $n_{PCID} = 0$ | 8 | 5 layers, ports 7 to 9, $n_{PCID} = 0$<br>5 layers, ports 10 and 11, $n_{PCID} = 0$ |
| 9 | 3 layers, ports 7 and 8, $n_{PCID} = 0$<br>3 layers, port 9, $n_{PCID} = 1$ | 9 | 5 layers, ports 7 to 9, $n_{PCID} = 0$<br>5 layers, ports 10 and 11, $n_{PCID} = 1$ |
| 10 | 3 layers, port 7, $n_{PCID} = 0$<br>3 layers, ports 8 and 9, $n_{PCID} = 1$ | 10 | 6 layers, ports 7 to 9, $n_{PCID} = 0$<br>6 layers, ports 10 to 12, $n_{PCID} = 0$ |
| 11 | 3 layers, port 7, $n_{PCID} = 0$<br>3 layers, ports 8 and 9, $n_{PCID} = 2$ | 11 | 6 layers, ports 7 to 9, $n_{PCID} = 0$<br>6 layers, ports 10 to 12, $n_{PCID} = 1$ |
| 12 | 4 layers, ports 7 and 8, $n_{PCID} = 0$<br>4 layers, ports 9 and 10, $n_{PCID} = 0$ | 12 | 7 layers, ports 7 to 10, $n_{PCID} = 0$<br>7 layers, ports 11 to 13, $n_{PCID} = 0$ |
| 13 | 4 layers, ports 7 and 8, $n_{PCID} = 0$<br>4 layers, ports 9 and 10, $n_{PCID} = 1$ | 13 | 7 layers, ports 7 to 10, $n_{PCID} = 0$<br>7 layers, ports 11 to 13, $n_{PCID} = 1$ |
| 14 | 4 layers, ports 7 and 8, $n_{PCID} = 0$<br>4 layers, ports 9 and 10, $n_{PCID} = 2$ | 14 | 8 layers, ports 7 to 10, $n_{PCID} = 0$<br>8 layers, ports 11 to 14, $n_{PCID} = 0$ |
| 15 | 4 layers, ports 7 and 8, $n_{PCID} = 1$<br>4 layers, ports 9 and 10, $n_{PCID} = 2$ | 15 | 8 layers, ports 7 to 10, $n_{PCID} = 0$<br>8 layers, ports 11 to 14, $n_{PCID} = 1$ |

$N_{SCID}$ in Table 17 and Table 18 represents a scrambling code sequence.

A person skilled in the art should know that the foregoing tables are merely examples provided for more clearly describing the technical solutions in the embodiments of the present invention, and are not intended to limit the present invention. Other possible information used to indicate a correspondence between identification information of a power configuration parameter and at least one of a quantity of data streams, an antenna port, and a codeword, and other possible information used to indicate a correspondence between a scrambling code sequence, and identification information of a power configuration parameter and at least one of a quantity of data streams, an antenna port, and a codeword also fall within the protection scope of the embodiments of the present invention.

3. Optionally, the terminal device may determine the antenna port sets respectively corresponding to the M power configuration parameters. In other words, the terminal device determines transmission points respectively corresponding to the M power configuration parameters.

For example, the terminal device usually knows at least one of a quantity of data streams, an antenna port, and a codeword of each antenna port set transmitting data to the terminal device. Therefore, the terminal device may determine the antenna port sets respectively corresponding to the M power configuration parameters, based on the information used to indicate the correspondence between identification information of a power configuration parameter and at least one of a quantity of data streams, an antenna port, and a codeword, or based on the at least one of the quantity of data streams, the antenna port, and the codeword of the antenna port set and the information used to indicate the correspondence between a scrambling code sequence, and identification information of a power configuration parameter and at least one of a quantity of data streams, an antenna port, and a codeword.

For example, if the base station sends, to the terminal device, the information used to indicate the correspondence between a codeword and identification information of a power configuration parameter, the terminal device usually knows a codeword of each antenna port set transmitting data to the terminal device. Therefore, the terminal device may determine, based on the codeword of the antenna port set and $n_{PCID}$ that is included in the information used to indicate the correspondence between a codeword and identification information of a power configuration parameter, the antenna port sets respectively corresponding to the M power configuration parameters. Certainly, if the base station sends, to the terminal device, the information used to indicate the correspondence between a quantity of data streams and identification information of a power configuration parameter, the terminal device needs to know a quantity of data streams of an antenna port set in advance. If the base station sends, to the terminal device, the information used to indicate the correspondence between a quantity of data streams, an antenna port, and identification information of a power configuration parameter, the terminal device needs to know a quantity of data streams and an antenna port of an antenna port set in advance. In other words, the terminal device needs to know corresponding information. Details are not described herein.

4. Optionally, the terminal device may obtain power of a downlink data channel between each of the M antenna port sets and the terminal device, in other words, power of a downlink data channel sent by each of the M antenna port sets.

For a manner of obtaining the power by the terminal device, refer to the foregoing description. Details are not described herein again. Optionally, after obtaining the power of the downlink data channel between each of the M antenna port sets and the terminal device, the terminal device may separately demodulate data transmitted by the M antenna port sets by using respective downlink data channels. Because the terminal device demodulates, by using power corresponding to each downlink data channel, data transmitted by the downlink data channel, a demodulation result is relatively accurate, so as to improve data demodulation performance.

Optionally, the base station may deliver data to the terminal device based on control information, and the terminal device may receive, based on the control information, the data delivered by the base station, and the terminal device may also normally demodulate the data.

Figure 5:
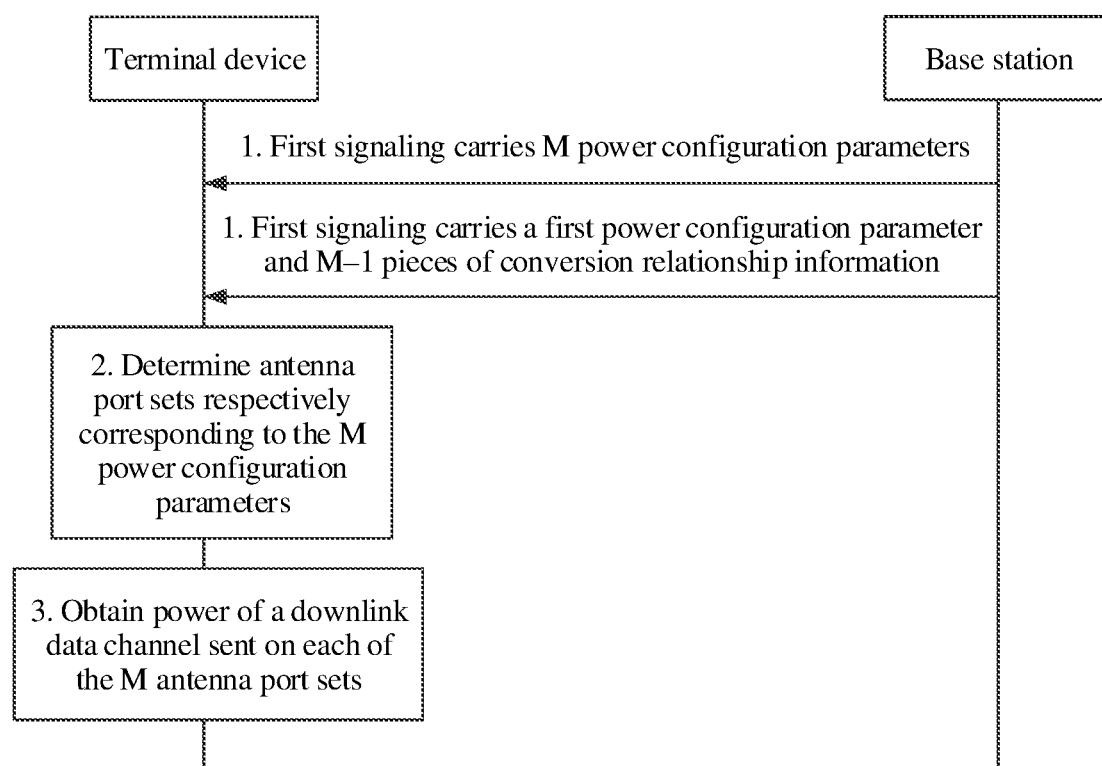
FIG. 5 is a flowchart of a second method for calculating power based on a power configuration parameter according to an embodiment of the present invention.

For an example 2, refer to FIG. 5.

1. The base station sends the M power configuration parameters to the terminal device by using first signaling, and the terminal device may receive the first signaling.

or a Doppler frequency shift. The modification herein is mainly adding new content to original signaling. For example, the original signaling carries only one power configuration parameter. In this embodiment of the present invention, after being modified, the signaling may carry a plurality of power configuration parameters. The following are examples.

For example, an example in which the first signaling is the signaling obtained after the signaling used to indicate the PDSCH-Config information element is modified is used, and M is, for example, equal to 2. An example of the first signaling is as follows:

```
PDSCH-Config information element
-- ASN1START
PDSCH-ConfigCommon :: =         SEQUENCE {
    referenceSignalPower            INTEGER (-60..50),
    p-b                                                     INTEGER
(0..3)
}
PDSCH-ConfigDedicated :: =      SEQUENCE {
    p-a
    ENUMERATED {
                                                            dB-6,
dB-4dot77, dB-3, dB-1dot77,
                                                            dBo,
dB1, dB2, dB3}
    referenceSignalPower-cooperate  INTEGER (-60..50),
    p-b    -cooperate                                       INTEGER
(0..3)
           p-a      cooperate
    ENUMERATED {
                                                            dB-6,
dB-4dot77, dB-3, dB-1dot77,
                                                            dBo,
dB1, dB2, dB3}
}
```

Optionally, each power configuration parameter may be in a correspondence with an antenna port set, or each power configuration parameter may be in a correspondence with at least one of a quantity of data streams, an antenna port, and a codeword. Optionally, the correspondence may also be carried in the first signaling. To be specific, in addition to the M power configuration parameters, the first signaling may further carry information used to indicate a correspondence between each power configuration parameter and an antenna port set. Alternatively, the first signaling may further carry information used to indicate a correspondence between each power configuration parameter and at least one of a quantity of data streams, an antenna port, and a codeword. Alternatively, the correspondence may be predefined in a protocol, or may be negotiated by the base station and the terminal device in advance. In this way, after receiving the first signaling, the terminal device may determine a correspondence between a power configuration parameter and an antenna port set, and there is no need to add the correspondence to the first signaling, so as to save a transmission resource.

Optionally, the first signaling may be higher layer signaling. For example, the first signaling may be signaling obtained after signaling used to indicate a PDSCH configuration information element (PDSCH-Config information element) is modified, or the first signaling may be signaling obtained after signaling used to indicate a PDSCH quasi co-location (QCL) configuration parameter is modified. Quasi co-location means that if two antenna port sets are QCL, the two antenna port sets usually have a same large-scale feature, for example, a feature such as a Doppler delay In this example, a part starting from "cooperate" is a newly added part. For example, in this example, the information used to indicate the correspondence between each power configuration parameter and an antenna port set or the information used to indicate the correspondence between each power configuration parameter and at least one of a quantity of data streams, an antenna port, and a codeword is predefined in a protocol, and the information is not carried in the first signaling.

For example, when the information is predefined in the protocol, it may be stipulated that a PDSCH common configuration (PDSCH-Configcommon) and a PDSCH dedicated configuration (PDSCH-ConfigDedicated) in the PDSCH-Config information element are used to indicate a power configuration parameter of a first antenna port, and at least one of a quantity of data streams, an antenna port, and a codeword that are corresponding to the first antenna port, and the newly added "cooperate" is used to indicate a power configuration parameter of a second antenna port, and at least one of a quantity of data streams, an antenna port, and a codeword that are corresponding to the second antenna port. If one transmission point is one cell, in other words, one antenna port set is an antenna port set of one cell, optionally, the first antenna port may be a serving cell of the terminal device, and the second antenna port may be a coordinated cell of the terminal device.

For example, an example in which the first signaling is the signaling obtained after the signaling used to indicate the PDSCH QCL configuration parameter is modified is used, and M is, for example, equal to 2. An example of the first signaling is as follows:

```
PDSCH-RE-MappingQCL-Config-r11 :: =    SEQUENCE {
    pdsch-RE-MappingQCL-ConfigId-r11    PDSCH-RE-MappingQCL-ConfigId-r11,
    referenceSignalPower-cooperate      INTEGER (-60..50),
    p-b-cooperate                       INTEGER (0..3)
    p-a-cooperate                       ENUMERATED {dB-6, dB-4dot77, dB-3, dB-1dot77, dBo, dB1, dB2, dB3}
    optionalSetOfFields-r11             SEQUENCE {
        crs-PortsCount-r11                  ENUMERATED {n1, n2, n4, spare1},
        crs-FreqShift-r11                   INTEGER (0..5),
        mbsfn-SubframeConfigList-r11        CHOICE {
            release                             NULL,
            setup
                SEQUENCE {
                    subframeConfigList              MBSFN-SubframeConfigList
                }
        }
        pdsch-Start-r11                     OPTIONAL, -- Need ON
                                            ENUMERATED {reserved, n1, n2, n3, n4, assigned}
    }                                   OPTIONAL, -- Need OP
    csi-RS-ConfigZPId-r11               CSI-RS-ConfigZPId-r11,
    qcl-CSI-RS-ConfigNZPId-r11          CSI-RS-ConfigNZPId-r11
                                        OPTIONAL, -- Need OR
    ...
}
```

In this example, a part starting from "pdsch-RE-MappingQCL-ConfigId-r11" until "optionalSetOfFields-r11" is a newly added part. In addition, in this example, only how to indicate a newly added power configuration parameter is shown, and how to indicate an original power configuration parameter is not shown. For example, in this example, the information used to indicate the correspondence between each power configuration parameter and an antenna port set or the information used to indicate the correspondence between each power configuration parameter and at least one of a quantity of data streams, an antenna port, and a codeword is predefined in a protocol, and the information is not carried in the first signaling.

For example, when the information is predefined in the protocol, it may be stipulated that the newly added "cooperate" in the signaling used to indicate the PDSCH QCL configuration parameter is used to indicate a power configuration parameter of a second antenna port, and at least one of a quantity of data streams, an antenna port, and a codeword of the second antenna port that are corresponding to the second antenna port. If one transmission point is one cell, in other words, one antenna port set is an antenna port set of one cell, optionally, the second antenna port may be a coordinated cell of the terminal device, and the first antenna port that is originally indicated in the signaling used to indicate the PDSCH QCL configuration parameter may be a serving cell of the terminal device.

Alternatively, step 1 may be that the base station sends a first power configuration parameter and M−1 pieces of conversion relationship information to the terminal device by using first signaling.

Optionally, the first power configuration parameter and each of the M−1 pieces of conversion relationship information may be in a correspondence with an antenna port set, or the first power configuration parameter and each of the M−1 pieces of conversion relationship information may be in a correspondence with at least one of a quantity of data streams, an antenna port, and a codeword. Optionally, the correspondence may also be carried in the first signaling. To be specific, in addition to the first power configuration parameter and the M−1 pieces of conversion relationship information, the first signaling may further carry information used to indicate a correspondence between the first power configuration parameter and an antenna port set, and a correspondence between each of the M−1 pieces of conversion relationship information, and an antenna port set. Alternatively, the first signaling may further carry information used to indicate a correspondence between the first power configuration parameter and at least one of a data stream, an antenna port, and a codeword, and a correspondence between each of the M−1 pieces of conversion relationship information and at least one of a quantity of data streams, an antenna port, and a codeword. Alternatively, the correspondence may be predefined in a protocol, or may be negotiated by the base station and the terminal device in advance. In this way, after receiving the first signaling, the terminal device may determine a correspondence between the first power configuration parameter and an antenna port set, or, a correspondence between a piece of conversion relationship information and an antenna port set, and there is no need to add the correspondence to the first signaling, so as to save a transmission resource.

The first power configuration parameter may be one of the M power configuration parameters, and each piece of conversion relationship information includes a conversion relationship between the first power configuration parameter and a power configuration parameter other than the first power configuration parameter in the M power configuration parameters. The M−1 pieces of conversion relationship information are used to obtain M−1 power configuration parameters. For example, an antenna port set corresponding to the first power configuration parameter is referred to as a first antenna port set. Optionally, for example, the first antenna port set may be an antenna port set provided by the base station. If one transmission point is one cell, the first antenna port set may be, for example, a serving cell of the terminal device.

Optionally, the first signaling may be higher layer signaling. For example, the first signaling may be signaling used to indicate a PDSCH-Config information element, or the first signaling may be signaling used to indicate a PDSCH QCL configuration parameter.

Optionally, for example, a second power configuration parameter is any power configuration parameter other than the first power configuration parameter in the M power configuration parameters, and information about a conversion relationship between the second power configuration parameter and the first power configuration parameter may include a ratio of power of an antenna port set corresponding to the second power configuration parameter to power of an antenna port set corresponding to the first power configuration parameter, and/or an offset between each parameter included in the second power configuration parameter and a corresponding parameter included in the first power configuration parameter. Certainly, content included in the conversion relationship information is not limited thereto, provided that another power configuration parameter can be obtained based on the conversion relationship information and the first power configuration parameter.

Optionally, for the M power configuration parameters, the base station may send the M power configuration parameters, or the base station may send the first power configuration parameter and the M−1 pieces of conversion relationship information, or the base station may send a plurality of power configuration parameters and conversion relationship information corresponding to the other power configuration parameters. If the base station sends the plurality of power configuration parameters, the conversion relationship information sent by the base station may be information about a conversion relationship with one power configuration parameter, or may be information about conversion relationships with different power configuration parameters.

The M antenna port sets corresponding to the M power configuration parameters in FIG. 5 may belong to a same base station or different base stations. For the corresponding description, refer to a related part of the example 1. An example in which one base station sends the M power configuration parameters to the terminal device, and the base station sends the correspondence to the terminal device is used in FIG. 5.

2. Optionally, the terminal device may determine, based on information carried in the first signaling, the antenna port sets respectively corresponding to the M power configuration parameters.

How the terminal device determines, based on the information carried in the first signaling, the antenna port sets respectively corresponding to the M power configuration parameters is already described in step 1. Details are not described herein again.

3. Optionally, the terminal device obtains power of a downlink data channel between each of the M antenna port sets and the terminal device, in other words, power of a downlink data channel sent by each of the M antenna port sets.

For a manner of obtaining the power by the terminal device, refer to the foregoing description. Details are not described herein again.

Figure 6:
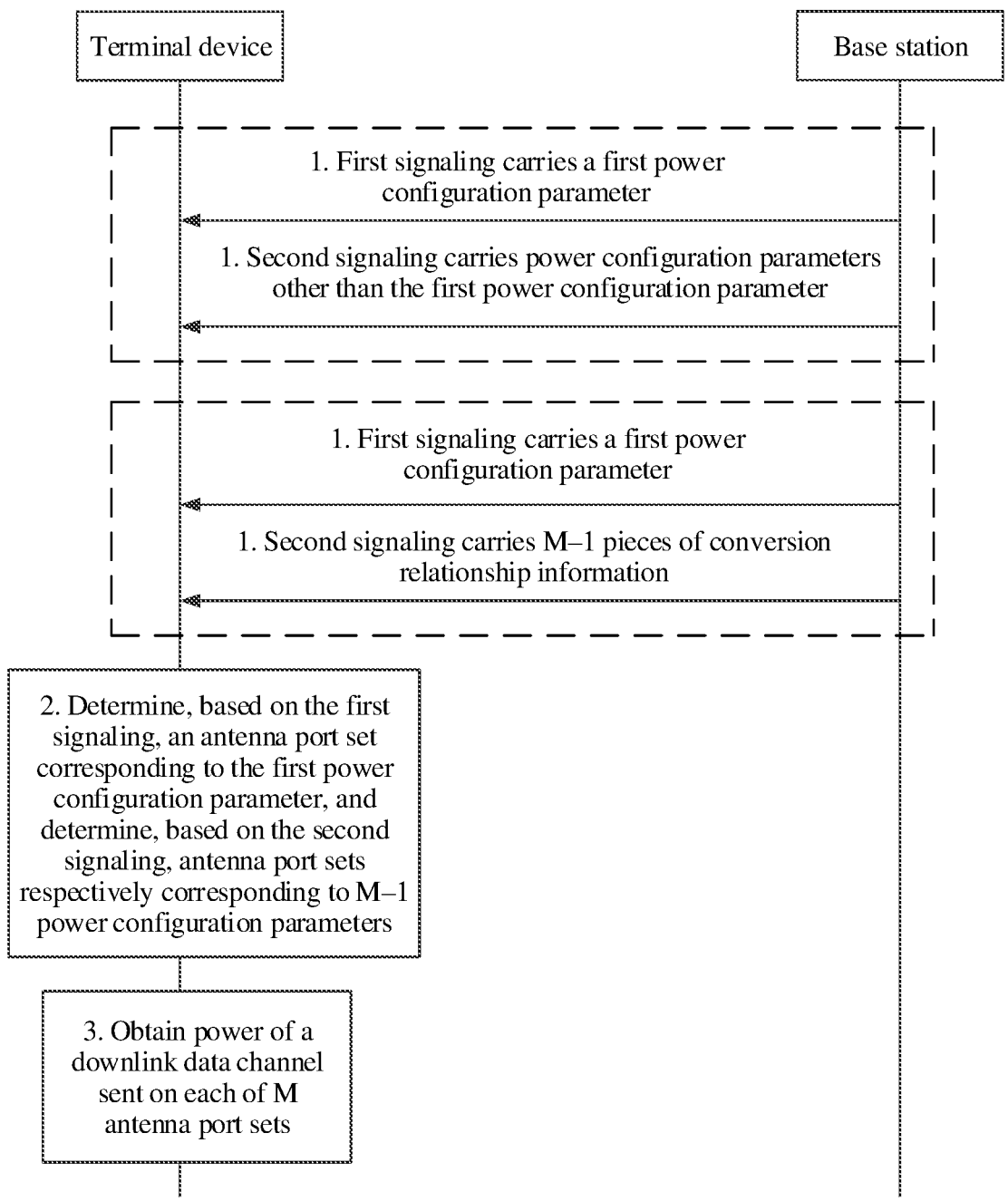
FIG. 6 is a flowchart of a third method for calculating power based on a power configuration parameter according to an embodiment of the present invention.

For an example 3,
refer to FIG. 6.

1. The base station sends a first power configuration parameter to the terminal device by using first signaling, and sends power configuration parameters other than the first power configuration parameter in the M power configuration parameters to the terminal device by using second signaling. The first power configuration parameter is one of the M power configuration parameters.

Optionally, each power configuration parameter may be in a correspondence with an antenna port set, or each power configuration parameter may be in a correspondence with at least one of a quantity of data streams, an antenna port, and a codeword. Optionally, the correspondence may also be carried in the second signaling. To be specific, the second signaling may further carry information used to indicate a correspondence between a power configuration parameter and an antenna port set, or the second signaling may further carry information used to indicate a correspondence between a power configuration parameter and at least one of a quantity of data streams, an antenna port, and a codeword. Optionally, the second signaling may carry information used to indicate a correspondence between a power configuration parameter other than the first power configuration parameter and an antenna port set, or the second signaling may carry information used to indicate a correspondence between each of the power configuration parameters (including the first power configuration parameter) and an antenna port set. Optionally, the second signaling may carry information used to indicate a correspondence between a power configuration parameter other than the first power configuration parameter and at least one of a quantity of data streams, an antenna port, and a codeword, or the second signaling may carry information used to indicate a correspondence between each of the power configuration parameters (including the first power configuration parameter) and at least one of a quantity of data streams, an antenna port, and a codeword. Alternatively, the correspondence may be predefined in a protocol, or may be negotiated by the base station and the terminal device in advance. In this way, after receiving the first signaling and the second signaling, the terminal device may determine a correspondence between a power configuration parameter and an antenna port set, and there is no need to add the correspondence to the second signaling, so as to save a transmission resource.

For example, an antenna port set corresponding to the first power configuration parameter is referred to as a first antenna port set. Optionally, for example, the first antenna port set may be an antenna port set provided by the base station. If one transmission point is one cell, the first antenna port set may be correspondingly a serving cell of the terminal device.

Optionally, for example, the first signaling may be higher layer signaling. For example, if the first antenna port set is correspondingly the serving cell of the terminal device, the first signaling may be prior-art signaling used to send a power configuration parameter of the serving cell to the terminal device.

Optionally, for example, the second signaling may be physical layer signaling. For example, the second signaling may be DCI or other possible physical layer signaling.

Alternatively, step 1 may be that the base station sends a first power configuration parameter to the terminal device by using first signaling, and sends M−1 pieces of conversion relationship information to the terminal device by using second signaling.

Optionally, the first power configuration parameter and each of the M−1 pieces of conversion relationship information may be in a correspondence with an antenna port set, or the first power configuration parameter and each of the M−1 pieces of conversion relationship information may be in a correspondence with at least one of a quantity of data streams, an antenna port, and a codeword. Optionally, the correspondence may also be carried in the second signaling. To be specific, the second signaling may further carry information used to indicate a correspondence between each of the M−1 pieces of conversion relationship and an antenna port set, or the second signaling may further carry information used to indicate a correspondence between each of the M−1 pieces of conversion relationship and at least one of a quantity of data streams, an antenna port, and a codeword. Each piece of conversion relationship information includes a conversion relationship between the first power configuration parameter and a power configuration parameter other than the first power configuration parameter in the M power configuration parameters. The M−1 pieces of conversion relationship information are used to obtain M−1 power configuration parameters.

For example, a first antenna port set may be correspondingly a serving cell of the terminal device. Therefore, the terminal device certainly knows that a power configuration parameter of the first antenna port set is transmitted by using the first signaling, and the terminal device may determine, based on the corresponding correspondence and the second signaling, the antenna port set corresponding to each power configuration parameter.

The M antenna port sets corresponding to the M power configuration parameters in FIG. 6 may belong to a same base station or different base stations. For the corresponding description, refer to a related part of the example 1. An example in which one base station sends the M power configuration parameters to the terminal device, and the base station sends the correspondence to the terminal device is used in FIG. 6.

2. Optionally, the terminal device may determine, based on information carried in the first signaling, an antenna port set corresponding to the first power configuration parameter, and may determine, based on information carried in the second signaling, antenna port sets respectively corresponding to power configuration parameters other than the first power configuration parameter in the M power configuration parameters.

How the terminal device determines, based on the information carried in the first signaling and the information carried in the second signaling, the antenna port sets respectively corresponding to the M power configuration parameters is already described in step 1. Details are not described herein again.

3. Optionally, the terminal device obtains power of a downlink data channel between each of the M antenna port sets and the terminal device, in other words, power of a downlink data channel sent by each of the M antenna port sets.

For a manner of obtaining the power by the terminal device, refer to the foregoing description. Details are not described herein again.

Devices provided in embodiments of the present invention are described below with reference to the accompanying drawings.

Figure 7:
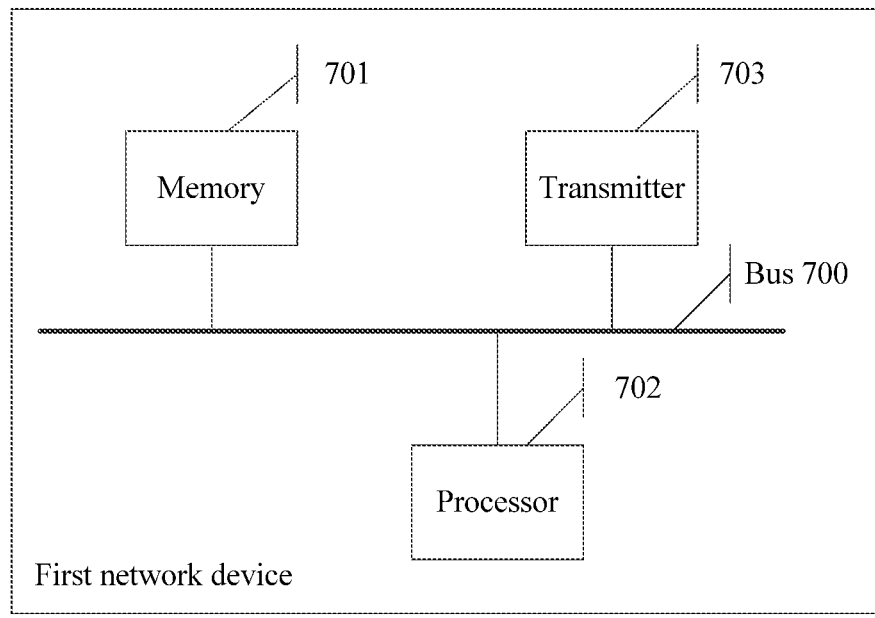
FIG. 7 is a possible schematic structural diagram of a first network device according to an embodiment of the present invention.

Referring to FIG. 7, based on a same inventive concept, a first network device is provided. The network device may include a memory 701, a processor 702, and a transmitter 703.

For example, the processor 702 may include a central processing unit (CPU) or an application-specific integrated circuit (ASIC), may include one or more integrated circuits configured to control program execution, may include a hardware circuit developed by using a field programmable gate array (FPGA), or may include a baseband chip.

There may be one or more memories 701. The memory 701 may include a read only memory (ROM), a random access memory (RAM), a magnetic disk memory, and the like. The memory 701 may be configured to store an instruction required by the processor 702 to execute a task, and may be further configured to store data.

The transmitter 703 may belong to a radio frequency system, and is configured to perform network communication with an external device. For example, the transmitter 703 may communicate with the external device by using a network such as an Ethernet, a radio access network, or a wireless local area network.

The memory 701 and the transmitter 703 may be connected to the processor 702 by using a bus 700 (which is used as an example in FIG. 7), or may be connected to the processor 702 by using a dedicated connection cable.

The processor 702 is designed and programmed to permanently write code corresponding to the foregoing methods into a chip, so that when being operated, the chip can perform the methods described in the foregoing embodiments. How to design and program the processor 702 is a technology well known to a person skilled in the art. Details are not described herein.

The network device may be configured to perform the methods in FIG. 2 to FIG. 6. For example, the network device may be the first network device described above. Therefore, for functions and the like implemented by the units in the network device, refer to the description of the foregoing methods. Details are not described again.

Figure 8:
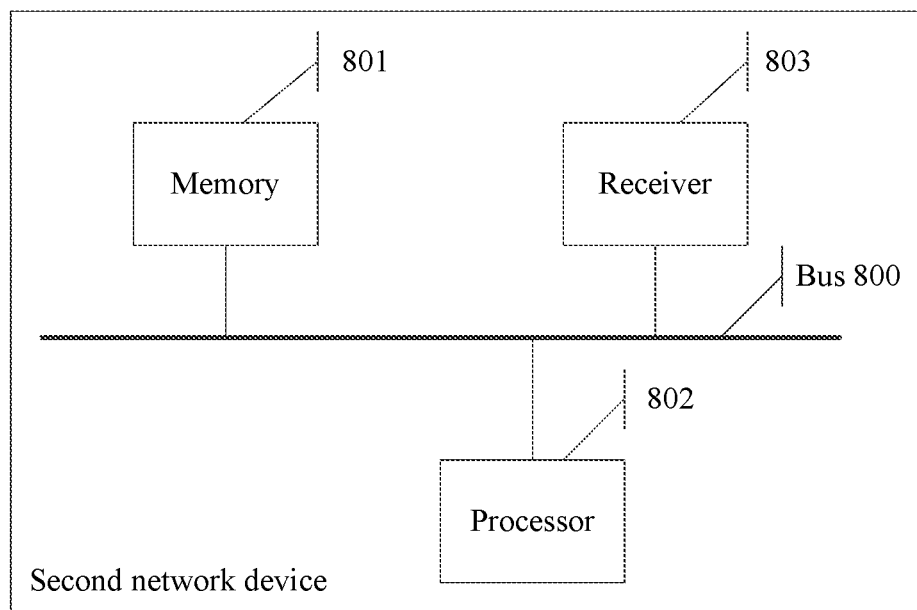
FIG. 8 is a possible schematic structural diagram of a second network device according to an embodiment of the present invention.

Referring to FIG. 8, based on a same inventive concept, a second network device is provided. The network device may include a memory 801, a processor 802, and a receiver 803.

For example, the processor 802 may include a CPU or an ASIC, may include one or more integrated circuits configured to control program execution, may include a hardware circuit developed by using an FPGA, or may include a baseband chip.

There may be one or more memories 801. The memory 801 may include a ROM, a RAM, a magnetic disk memory, and the like. The memory 801 may be configured to store an instruction required by the processor 802 to execute a task, and may be further configured to store data.

The receiver 803 may belong to a radio frequency system, and is configured to perform network communication with an external device. For example, the receiver 803 may communicate with the external device by using a network such as an Ethernet, a radio access network, or a wireless local area network.

The memory 801 and the receiver 803 may be connected to the processor 802 by using a bus 800 (which is used as an example in FIG. 8), or may be connected to the processor 802 by using a dedicated connection cable.

The processor 802 is designed and programmed to permanently write code corresponding to the foregoing methods into a chip, so that when being operated, the chip can perform the methods described in the foregoing embodiments. How to design and program the processor 802 is a technology well known to a person skilled in the art. Details are not described herein.

The network device may be configured to perform the methods in FIG. 2 to FIG. 6. For example, the network device may be the second network device described above. Therefore, for functions and the like implemented by the units in the network device, refer to the description of the foregoing methods. Details are not described again.

Figure 9:
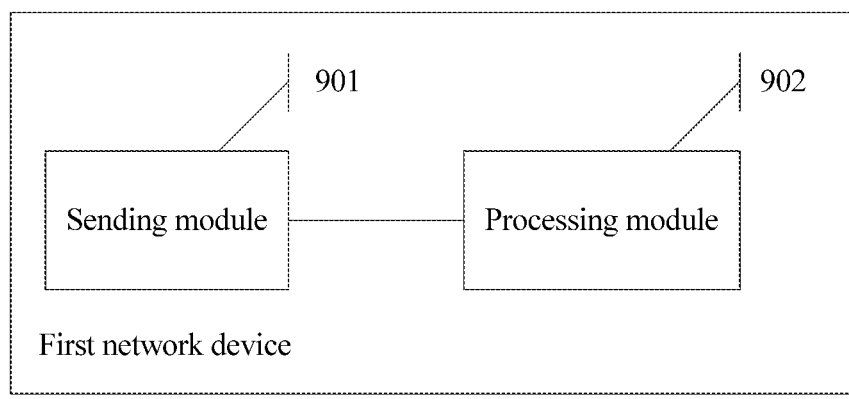
FIG. 9 is a possible structural block diagram of a first network device according to an embodiment of the present invention.

Referring to FIG. 9, based on a same inventive concept, an embodiment of the present invention provides a third network device. The network device may include a sending module 901. Optionally, the network device may further include a processing module 902 that is also shown in FIG. 9.

In an actual application, an entity device corresponding to the sending module 901 may be the transmitter 703 in FIG. 7, and an entity device corresponding to the processing module 902 may be the processor 702 in FIG. 7.

The network device may be configured to perform the methods in FIG. 2 to FIG. 6. For example, the network device may be the first network device. Therefore, for functions and the like implemented by the units in the network device, refer to the description of the foregoing methods. Details are not described again.

Figure 10:
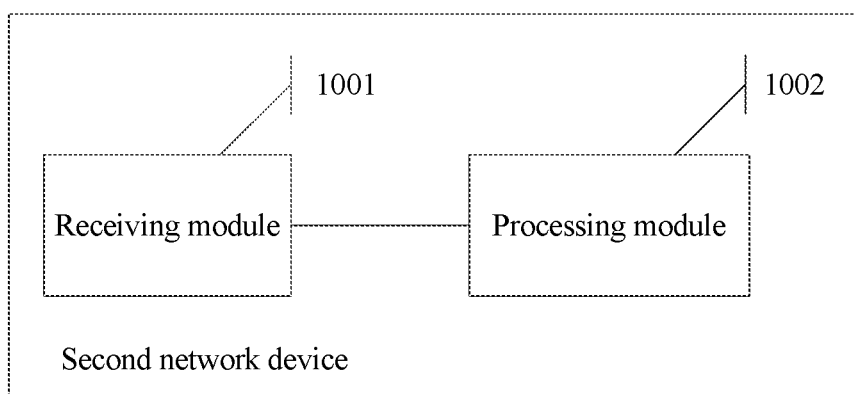
FIG. 10 is a possible structural block diagram of a second network device according to an embodiment of the present invention.

Referring to FIG. 10, based on a same inventive concept, an embodiment of the present invention provides a fourth network device. The network device may include a receiving module 1001. Optionally, the network device may further include a processing module 1002 that is also shown in FIG. 10.

In an actual application, an entity device corresponding to the receiving module 1001 may be the receiver 803 in FIG. 8, and an entity device corresponding to the processing module 1002 may be the processor 802 in FIG. 8.

The network device may be configured to perform the methods in FIG. 2 to FIG. 6. For example, the network device may be the second network device. Therefore, for functions and the like implemented by the units in the network device, refer to the description of the foregoing methods. Details are not described again.

In the embodiments of the present invention, the first network device may send M power configuration parameters to the second network device. In this way, the second network device may separately obtain power of a downlink data channel between a corresponding cell and the second network device based on the M power configuration parameters, so that the second network device can demodulate, based on the obtained power, data sent by a corresponding cell, to obtain a relatively accurate demodulation result.

In the embodiments of the present invention, it should be understood that the disclosed device and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. A part or all of the units may be selected based on an actual requirement to achieve the embodiments of the present invention.

Functional units in the embodiments of the present invention may be integrated into one processing unit, or each of the units may exist alone physically.

When the integrated unit is implemented in the form of a software functional unit and sold or used as an independent product, the integrated unit may be stored in a computer-readable storage medium. Based on such an understanding, all or a part of technical solutions of the present invention may be implemented in a form of a software product. The software product is stored in a storage medium and includes several instructions for instructing a computer device, such as a personal computer, a server, a network device, or a processor to perform all or a part of the steps of the methods described in the embodiments of the present invention. The foregoing storage medium includes any medium that can store program code, such as a Universal Serial Bus flash drive, a removable hard disk, a ROM, a RAM, a magnetic disk, or an optical disc.

The foregoing embodiments are merely used to describe the technical solutions of the embodiments of the present invention. The foregoing embodiments are merely intended to help understand the method of the embodiments of the present invention, and shall not be construed as a limitation on the embodiments of the present invention. Any variation or replacement readily figured out by a person skilled in the art shall fall within the protection scope of the embodiments of the present invention.

What is claimed is:

1. A power configuration method, comprising:
   receiving, by a terminal, M power configuration parameters from a network device, wherein the M power configuration parameters correspond to M antenna port sets, wherein at least one of the M antenna port sets belongs to the network device, wherein M is an integer greater than or equal to 2; and
   demodulate, according to a calculated power of a downlink data channel, data transmitted to the terminal on the downlink data channel by an antenna port set of the M antenna port sets, wherein the calculated power of the downlink data channel is determined according to a respective power configuration parameter that is of the M power configuration parameters and that is associated with the antenna port set.

2. The method according to claim 1, wherein at least one power configuration parameter of the M power configuration parameters comprises reference signal power corresponding to the respective power configuration parameter, and wherein the respective power configuration parameter further comprises at least one of a first parameter and a second parameter, wherein the first parameter indicates a ratio of a power of a respective antenna port set of the at least one of the M antenna port sets corresponding to the power configuration parameter when a cell-specific reference signal exists on a symbol to a power of the respective antenna port set when no cell-specific reference signal exists on the symbol, and wherein the second parameter is a dedicated parameter associated with power of the downlink data channel sent on the respective antenna port set corresponding to the power configuration parameter.

3. The method according to claim 2, wherein each power configuration parameter of the M power configuration parameters further comprises identification information identifying the power configuration parameter; and
   wherein the method further comprises:
   receiving, by the terminal, information from the network device that indicates a correspondence between identification information of the respective power configuration parameter and at least one of a quantity of data streams, an antenna port, and a codeword; and
   determining, by the terminal, at least one antenna port set of the at least one of the M antenna port sets respectively corresponding to at least one of the M power configuration parameters according to at least one of the quantity of data streams, the antenna port, and the codeword of the respective antenna port set, and further according to the information used to indicate the correspondence between identification information of a power configuration parameter and at least one of the quantity of data streams, the antenna port, and the codeword.

4. The method according to claim 2, wherein each power configuration parameter of the M power configuration parameters further comprises identification information identifying the power configuration parameter; and wherein the method further comprises:
receiving, by the terminal, information from the network device that indicates a correspondence between a scrambling code sequence, and identification information of the respective power configuration parameter and at least one of a quantity of data streams, an antenna port, and a codeword; and determining, by the terminal, at least one antenna port set of the at least one of the M antenna port sets respectively corresponding to at least one of the M power configuration parameters according on the scrambling code sequence and at least one of the quantity of data streams, the antenna port, and the codeword of the respective antenna port set of the at least one of the M antenna port sets, and according to the information used to indicate the correspondence between the scrambling code sequence, and identification information of the respective power configuration parameter and at least one of the quantity of data streams, the antenna port, and the codeword.

5. The method according to claim 1, wherein the receiving the M power configuration parameters from the network device comprises:
receiving, by the terminal, first signaling from the network device, wherein the first signaling carries the M power configuration parameters; and wherein the method further comprises performing at least one of:
determining, by the terminal, according to a correspondence between each power configuration parameter and a respective antenna port set of the at least one of the M antenna port sets, at least one antenna port set of the at least one of the M antenna port sets respectively corresponding at least one of the M power configuration parameters; or determining, by the terminal according to a correspondence between each power configuration parameter and at least one of a quantity of data streams, an antenna port, and a codeword, at least one antenna port set of the at least one of the M antenna port sets respectively corresponding to each of the M power configuration parameters.

6. The method according to claim 1, wherein the receiving the M power configuration parameters from a network device, comprises:
receiving, by the terminal, first signaling from the network device, wherein the first signaling carries a first power configuration parameter and M−1 pieces of conversion relationship information, wherein the first power configuration parameter is one of the M power configuration parameters, and wherein each piece of conversion relationship information of the M−1 pieces of conversion relationship information comprises a conversion relationship between the first power configuration parameter and a power configuration parameter other than the first power configuration parameter in the M power configuration parameters; and wherein the method further comprises:
determining, by the terminal, an antenna port set corresponding to the first power configuration parameter, and obtaining M−1 power configuration parameters other than the first power configuration parameter in the M power configuration parameters according to the M−1 pieces of conversion relationship information and the first power configuration parameter; and performing at least one of:
determining, by the terminal, according to a correspondence between the first power configuration parameter, each of the M−1 pieces of conversion relationship information, and the antenna port set, wherein at least one antenna port set of the at least one of the M antenna port sets respectively corresponds to at least one of the M power configuration parameters; or determining, by the terminal according to a correspondence between the first power configuration parameter, each of the M−1 pieces of conversion relationship information, and at least one of a quantity of data streams, an antenna port, and a codeword, at least one antenna port set of the M antenna port sets respectively corresponding to at least one of the M power configuration parameters.

7. The method according to claim 6, wherein a second power configuration parameter is a power configuration parameter of the M power configuration parameters other than the first power configuration parameter; and wherein a first piece of conversion relationship information that is of the M−1 pieces of conversion relationship information and that is about a conversion relationship between the second power configuration parameter and the first power configuration parameter and that is comprised in the M−1 pieces of conversion relationship information comprises:
a ratio of a power of an antenna port set corresponding to the second power configuration parameter to a power of an antenna port set corresponding to the first power configuration parameter, and/or an offset between each parameter comprised in the second power configuration parameter and a corresponding parameter comprised in the first power configuration parameter.

8. The method according to claim 1, wherein the receiving, by a terminal, M power configuration parameters from a network device comprises:
receiving, by the terminal, first signaling and second signaling from the network device, wherein the first signaling carries a first power configuration parameter, wherein the second signaling carries M−1 power configuration parameters other than the first power configuration parameter of the M power configuration parameters, and wherein the first power configuration parameter is a power configuration parameter of the M power configuration parameters; and wherein the method further comprises performing at least one of:
determining, by the terminal, according to a correspondence between each of the M−1 power configuration parameters and an antenna port set of the M antenna port sets, at least one antenna port set of the M antenna port sets respectively corresponding to at least one of the M−1 power configuration parameters; or determining, by the terminal according to a correspondence between each of the M−1 power configuration parameters and at least one of a quantity of data streams, an antenna port, and a codeword, at least one antenna port set of the M antenna port sets respectively corresponding to the M−1 power configuration parameters.

9. The method according to claim 1, wherein the receiving the M power configuration parameters from a network device comprises:

receiving, by the terminal, first signaling and second signaling from the network device, wherein the first signaling carries a first power configuration parameter, the second signaling carries M−1 pieces of conversion relationship information, wherein the first power configuration parameter is one of the M power configuration parameters, and wherein each piece of conversion relationship information comprises a conversion relationship between the first power configuration parameter and each of M−1 power configuration parameters other than the first power configuration parameter in the M power configuration parameters; and wherein the method further comprises:

determining, by the terminal, an antenna port set of the M antenna port sets corresponding to the first power configuration parameter, and obtaining the M−1 power configuration parameters of the M power configuration parameters other than the first power configuration parameter in the M power configuration parameters according to the M−1 pieces of conversion relationship information and the first power configuration parameter; and performing at least one of determining, by the terminal, according to a correspondence between each of the M−1 pieces of conversion relationship information and an antenna port set, antenna port sets respectively corresponding to the M−1 power configuration parameters; or determining, by the terminal according to a correspondence between each of the M−1 pieces of conversion relationship information and at least one of a quantity of data streams, an antenna port, and a codeword, antenna port sets respectively corresponding to the M−1 power configuration parameters.

10. A power configuration apparatus, comprising:

a processor; and a non-transitory readable storage medium, wherein the non-transitory readable storage medium is configured to store a program to be executed by the processor, the program including instructions to:

send M power configuration parameters to a terminal, wherein the M power configuration parameters correspond to M antenna port sets, wherein a first power configuration parameter of the M power configuration parameters is sent using first signaling, and wherein at least one second power configuration parameter of the M power configuration parameters is sent using second signaling, wherein the first signaling is one of physical layer signaling or higher layer signaling, and wherein the second signaling is a different one of the physical layer signaling or higher layer signaling, wherein at least one of the M antenna port sets is associated with the apparatus, wherein each power configuration parameter indicates a power of a downlink data channel sent to the terminal on a corresponding antenna port set of the M antenna port sets, and wherein M is an integer greater than or equal to 2.

11. The apparatus according to claim 10, wherein at least one of the M power configuration parameters comprises reference signal power corresponding to the respective power configuration parameter, and further comprises at least one of a first parameter and a second parameter, wherein the first parameter indicates a ratio of a power of a respective antenna port set of the M antenna port sets corresponding to the respective power configuration parameter when a cell-specific reference signal exists on a symbol to a power of the respective antenna port set when no cell-specific reference signal exists on the symbol, and wherein the second parameter is a dedicated parameter indicating a power of the downlink data channel sent on the antenna port set corresponding to the respective power configuration parameter.

12. The apparatus according to claim 11, wherein each power configuration parameter of the M power configuration parameters further comprises identification information identifying the respective power configuration parameter; and wherein the program further includes instructions to perform at least one of:

send, to the terminal, information indicating a correspondence between identification information of a power configuration parameter and at least one of a quantity of data streams, an antenna port, and a codeword; or send, to the terminal, information indicating a correspondence between a scrambling code sequence, and identification information of a power configuration parameter of the M power configuration parameters and at least one of a quantity of data streams, an antenna port, and a codeword.

13. The apparatus according to claim 10, wherein the program further includes instructions to perform at least one of:

send the M power configuration parameters to the terminal using first signaling, wherein each power configuration parameter is in a correspondence with at least one of a respective antenna port set of the M antenna port sets, or with at least one of a quantity of data streams, an antenna port, and a codeword; or send a first power configuration parameter of the M power configuration parameters and M−1 pieces of conversion relationship information to the terminal using first signaling, wherein the first power configuration parameter and each of the M−1 pieces of conversion relationship information are in a correspondence with at least one of an antenna port set, or with at least one of a quantity of data streams, an antenna port, and a codeword, wherein each piece of conversion relationship information of the M−1 pieces of conversion relationship information comprises a conversion relationship between the first power configuration parameter and a power configuration parameter of the M power configuration parameters other than the first power configuration parameter in the M power configuration parameters, and wherein the M−1 pieces of conversion relationship information are associated with M−1 power configuration parameters.

14. The apparatus according to claim 13, wherein a second power configuration parameter is a power configuration parameter other than the first power configuration parameter of the M power configuration parameters; and wherein a piece of conversion relationship information of the M−1 pieces of conversion relationship information about a conversion relationship between the second power configuration parameter and the first power configuration parameter comprises at least one of:
a ratio of power of an antenna port set corresponding to the second power configuration parameter to power of an antenna port set corresponding to the first power configuration parameter; or
an offset between each parameter of the second power configuration parameter and a corresponding parameter of the first power configuration parameter.

15. The apparatus according to claim 10, wherein the program further includes instructions to perform at least one of:
send a first power configuration parameter of the M power configuration parameters to the terminal using first signaling, and send M−1 power configuration parameters of the M power configuration parameters other than the first power configuration parameter to the terminal using second signaling, wherein the first power configuration parameter is one of the M power configuration parameters, and each power configuration parameter is in a correspondence with an antenna port set, or each power configuration parameter is in a correspondence with at least one of a quantity of data streams, an antenna port, and a codeword; or
send a first power configuration parameter of the of the M power configuration parameters to the terminal using first signaling, and send M−1 pieces of conversion relationship information to the terminal using second signaling, wherein each piece of conversion relationship information of the M−1 pieces of conversion relationship information comprises a conversion relationship between the first power configuration parameter and a power configuration parameter of the M power configuration parameters other than the first power configuration parameter in the M power configuration parameters, wherein each of the M−1 pieces of conversion relationship information is in a correspondence with at least one of an antenna port set of the M antenna port sets, or with at least one of a quantity of data streams, an antenna port, and a codeword, and wherein the M−1 pieces of conversion relationship information are associated with the M−1 power configuration parameters.

16. A power configuration apparatus, comprising:
a processor; and
a non-transitory readable storage medium, wherein the non-transitory readable storage medium is configured to store a program to be executed by the processor, the program including instructions to:
receive M power configuration parameters from a network device, wherein the M power configuration parameters correspond to M antenna port sets, wherein at least one of the M antenna port sets belongs to the network device, and wherein M is an integer greater than or equal to 2; and
demodulate, according to a calculated power of a downlink data channel, data transmitted to the power configuration apparatus, on the downlink data channel by an antenna port set of the M antenna port sets, wherein the calculated power of the downlink data channel is determined according to a respective power configuration parameter that is of the M power configuration parameters and that is associated with the antenna port set.

17. The apparatus according to claim 16, wherein at least one of the M power configuration parameters comprises a reference signal power corresponding to the power configuration parameter, and further comprises at least one of a first parameter and a second parameter, wherein the first parameter indicates a ratio of a power of an antenna port set of the M antenna port sets corresponding to the power configuration parameter when a cell-specific reference signal exists on a symbol to a power of the antenna port set when no cell-specific reference signal exists on the symbol, and the second parameter is a dedicated parameter used to calculate power of a downlink data channel sent on the antenna port set corresponding to the power configuration parameter.

18. The apparatus according to claim 17, wherein each power configuration parameter further comprises identification information used to identify the power configuration parameter; and
wherein the program further includes instructions to:
receive information from the network device and that is used to indicate a correspondence between identification information of a power configuration parameter and at least one of a quantity of data streams, an antenna port, and a codeword; and
determine, according to at least one of the quantity of data streams, the antenna port, and the codeword of the antenna port set, and further according to the information used to indicate the correspondence between identification information of a power configuration parameter and at least one of a quantity of data streams, an antenna port, and a codeword, the antenna port sets respectively corresponding to the M power configuration parameters.

19. The apparatus according to claim 17, wherein each power configuration parameter of the M power configuration parameters further comprises identification information used to identify the power configuration parameter; and
wherein the program further includes instructions to:
receive information from the network device and that indicates a correspondence between a scrambling code sequence, and identification information of a power configuration parameter and a scrambling code sequence, and identification information of a power configuration parameter and at least one of a quantity of data streams, an antenna port, and a codeword; and
determine at least one antenna port set of the M antenna sets respectively corresponding to at least one power configuration parameter of the M power configuration parameters and according to a scrambling code sequence and at least one of the quantity of data streams, the antenna port, and the codeword of the respective antenna port set, and further according to the information indicating the correspondence between the scrambling code sequence, identification information of the power configuration parameter and at least one of the quantity of data streams, the antenna port, and the codeword.

20. The apparatus according to claim 16, wherein the program further includes instructions to:
receive first signaling from the network device, wherein the first signaling carries the M power configuration parameters; and
perform at least one of:
determine, according to a correspondence between each power configuration parameter of the M power configuration parameters and an antenna port set, at least one antenna port set of the M antenna port sets respectively corresponding to at least one power configuration parameter of the M power configuration parameters; or determine, according to a correspondence between each power configuration parameter and at least one of a quantity of data streams, an antenna port, and a codeword, the antenna port sets respectively corresponding to the M power configuration parameters.

* * * * *